(12) United States Patent
Ishii et al.

(10) Patent No.: US 12,008,602 B2
(45) Date of Patent: Jun. 11, 2024

(54) INFORMATION COMMUNICATION SYSTEM AND INFORMATION COMMUNICATION METHOD

(71) Applicant: Rakuten Group, Inc., Tokyo (JP)

(72) Inventors: Jun Ishii, Tokyo (JP); Takehito Nohara, Tokyo (JP); Sungsu Kim, Tokyo (JP); Fuminori Hayashi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/551,413

(22) Filed: Dec. 15, 2021

(65) Prior Publication Data

US 2022/0207573 A1 Jun. 30, 2022

(30) Foreign Application Priority Data

Dec. 24, 2020 (JP) ................................. 2020-214787

(51) Int. Cl.
*G06Q 30/02* (2023.01)
*G06Q 30/0241* (2023.01)
*G06Q 30/0242* (2023.01)
*G06Q 30/0251* (2023.01)

(52) U.S. Cl.
CPC ..... *G06Q 30/0277* (2013.01); *G06Q 30/0242* (2013.01); *G06Q 30/0251* (2013.01)

(58) Field of Classification Search
CPC ....................................... G06Q 30/0207–0277
See application file for complete search history.

(56) References Cited

U.S. PATENT DOCUMENTS

| 2002/0065855 | A1* | 5/2002 | Meyers | G06F 40/174 |
| | | | | 715/201 |
| 2002/0131496 | A1* | 9/2002 | Vasudevan | H04N 21/2402 |
| | | | | 375/240.11 |
| 2003/0126015 | A1* | 7/2003 | Chan | G06Q 30/02 |
| | | | | 705/14.16 |
| 2003/0195801 | A1 | 10/2003 | Takakura et al. | |

(Continued)

FOREIGN PATENT DOCUMENTS

| JP | 2002-123477 A | 4/2002 |
| JP | 2006-191608 A | 7/2006 |

(Continued)

*Primary Examiner* — David J Stoltenberg

(74) *Attorney, Agent, or Firm* — Sughrue Mion, PLLC

(57) ABSTRACT

An information communication system transmits an advertisement to a first terminal device used by a first user based on transmission of a message from the first terminal device to a second terminal device used by a second user. The information communication system causes the first terminal device to display an operation part operable to transmit the advertisement to the second terminal device. The information communication system transmits the advertisement to the second terminal device in response to operation of the displayed operation part by the first user. The information communication system executes processing of giving a reward to the first user based on recognition that the second user takes an action corresponding to a successful result of the advertisement after the second user selects the advertisement.

9 Claims, 13 Drawing Sheets

(56) References Cited

U.S. PATENT DOCUMENTS

| | | | | |
|---|---|---|---|---|
| 2004/0254859 A1* | 12/2004 | Aslanian, Jr. | ........ | G06Q 10/107 705/26.5 |
| 2005/0228680 A1* | 10/2005 | Malik | ..................... | H04L 51/04 705/26.1 |
| 2006/0184417 A1* | 8/2006 | Van der Linden | .......................... | G06Q 30/0275 705/14.46 |
| 2008/0103896 A1* | 5/2008 | Flake | ................. | G06Q 30/0244 705/14.54 |
| 2008/0195466 A1* | 8/2008 | Wright | .................... | H04L 51/14 705/14.41 |
| 2008/0307052 A1 | 12/2008 | Krishnan et al. | | |
| 2008/0313256 A1* | 12/2008 | Kanazawa | ......... | G06Q 30/0272 709/201 |
| 2009/0030774 A1* | 1/2009 | Rothschild | ......... | G06Q 30/0269 705/14.1 |
| 2009/0248633 A1* | 10/2009 | Ojakaar | .................. | G06Q 30/02 |
| 2009/0307089 A1* | 12/2009 | Binnewies | ............. | G06Q 30/02 705/14.69 |
| 2011/0087540 A1 | 4/2011 | Krishnan et al. | | |
| 2011/0087541 A1 | 4/2011 | Krishnan et al. | | |
| 2011/0246267 A1* | 10/2011 | Williams | ............... | G06Q 30/08 705/14.4 |
| 2012/0284093 A1* | 11/2012 | Evans | .................... | H04W 4/21 705/14.1 |
| 2013/0085849 A1* | 4/2013 | Dyor | .................. | G06Q 30/0255 705/14.49 |
| 2013/0085855 A1* | 4/2013 | Dyor | ...................... | G06F 3/048 715/728 |
| 2013/0086056 A1* | 4/2013 | Dyor | ................... | G06F 16/9535 715/728 |
| 2013/0086499 A1* | 4/2013 | Dyor | ..................... | G06F 16/951 715/764 |
| 2013/0151339 A1* | 6/2013 | Kim | ....................... | G06Q 30/02 705/14.55 |
| 2013/0159433 A1* | 6/2013 | Chavan | .............. | G06Q 30/0241 709/206 |
| 2015/0120462 A1* | 4/2015 | Zhang | ................ | G06Q 30/0267 705/14.64 |
| 2015/0170210 A1* | 6/2015 | Rhee | ...................... | G06Q 30/02 705/14.64 |
| 2015/0278882 A1* | 10/2015 | Ju | ....................... | G06Q 30/0276 705/14.69 |
| 2015/0324827 A1* | 11/2015 | Upstone | ................ | H04N 21/6582 705/14.19 |
| 2016/0301639 A1* | 10/2016 | Liu | ........................ | H04L 51/52 |
| 2017/0372369 A1* | 12/2017 | Kim | .................. | G06Q 30/0207 |
| 2018/0210612 A1* | 7/2018 | Lyubich | .................. | G06F 3/0481 |
| 2020/0242648 A1* | 7/2020 | Glazier | ................. | H04L 67/535 |

FOREIGN PATENT DOCUMENTS

| | | | | |
|---|---|---|---|---|
| JP | 2009-086854 A | 4/2009 | | |
| JP | 2018-25862 A | 2/2018 | | |
| TW | 200912787 A | 3/2009 | | |
| WO | WO2001013298 A2 * | 2/2001 | ............ | G06F 17/60 |
| WO | 2008/154106 A1 | 12/2008 | | |

* cited by examiner

FIG.3

MEMBER DB 14a

| USER ID |
|---|
| NAME |
| DISPLAY NAME |
| TELEPHONE NUMBER |
| NUMBER OF POSSESSED POINTS |
| ⋯ |

ADVERTISEMENT PERMISSION INFORMATION DB 14b

| USER ID |
|---|
| PERMISSION STATE LIST |
| ⋮ |

CHAT DB 14c

| CHAT ID |
|---|
| USER ID |
| USER ID |
| CHAT HISTORY |
| ⋯ |

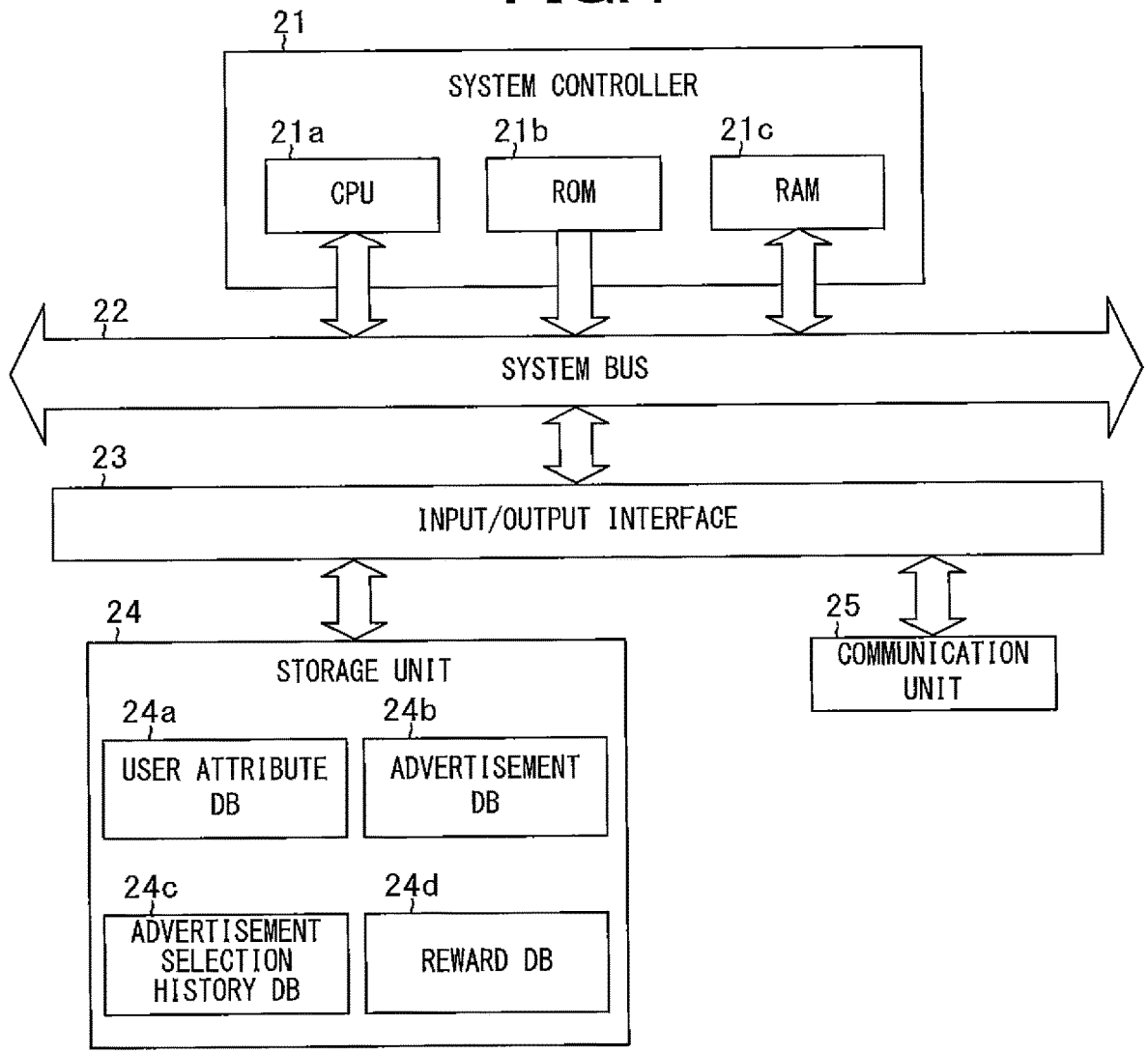

FIG.5

USER ATTRIBUTE DB 24a

| USER ID |
|---|
| USER ATTRIBUTE INFORMATION |

ADVERTISEMENT DB 24b

| ADVERTISEMENT ID |
|---|
| SERVICE ID |
| ADVERTISER ID |
| TRANSACTION TARGET ID |
| ADVERTISEMENT IMAGE |
| ADVERTISEMENT UNIT PRICE |
| LINK DESTINATION URL |
| ⋮ |

ADVERTISEMENT SELECTION HISTORY DB 24c

| TRACKING ID |
|---|
| SELECTION DATE AND TIME |
| ADVERTISEMENT ID |
| SERVICE ID |
| RCS-ID |
| CHAT ID |
| SELECTION USER ID |
| AFFILIATER ID |
| ⋮ |

REWARD DB 24d

| CONVERSION ID |
|---|
| CONVERSION-MADE DATE AND TIME |
| TRACKING ID |
| RCS-ID |
| CHAT ID |
| TRANSACTION USER ID |
| AFFILIATER ID |
| AFFILIATER REWARD AMOUNT |
| RCS REWARD AMOUNT |
| ⋮ |

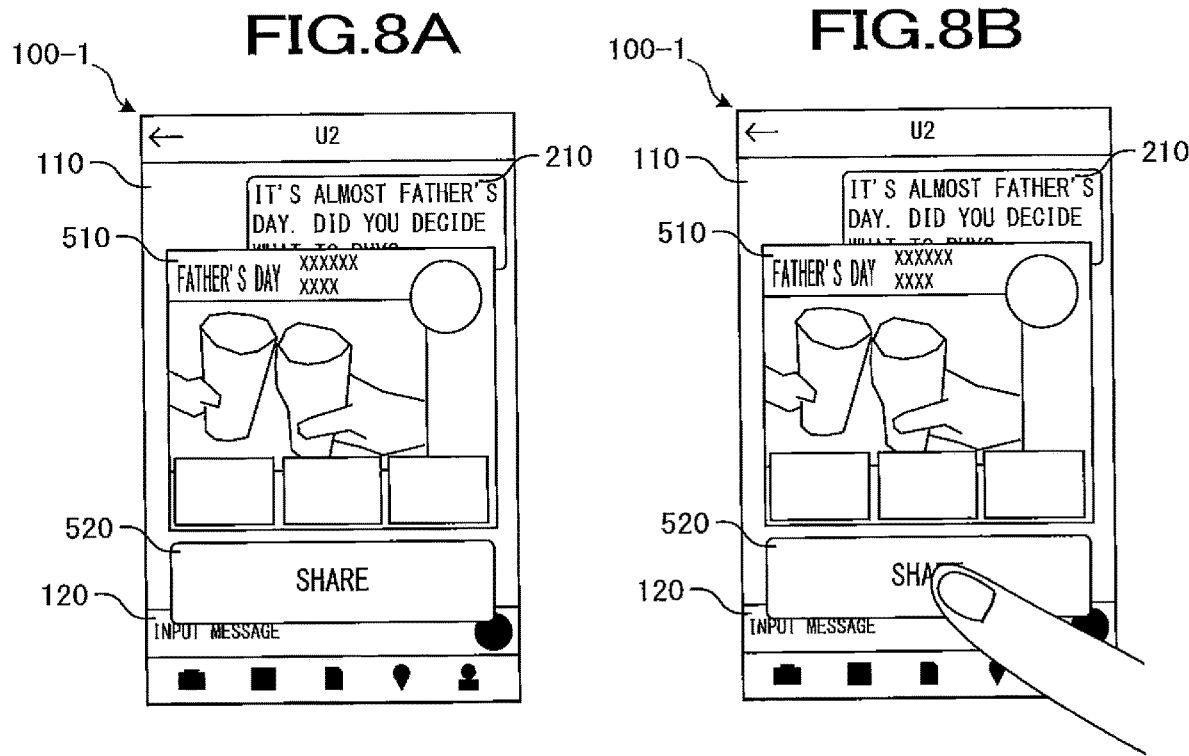
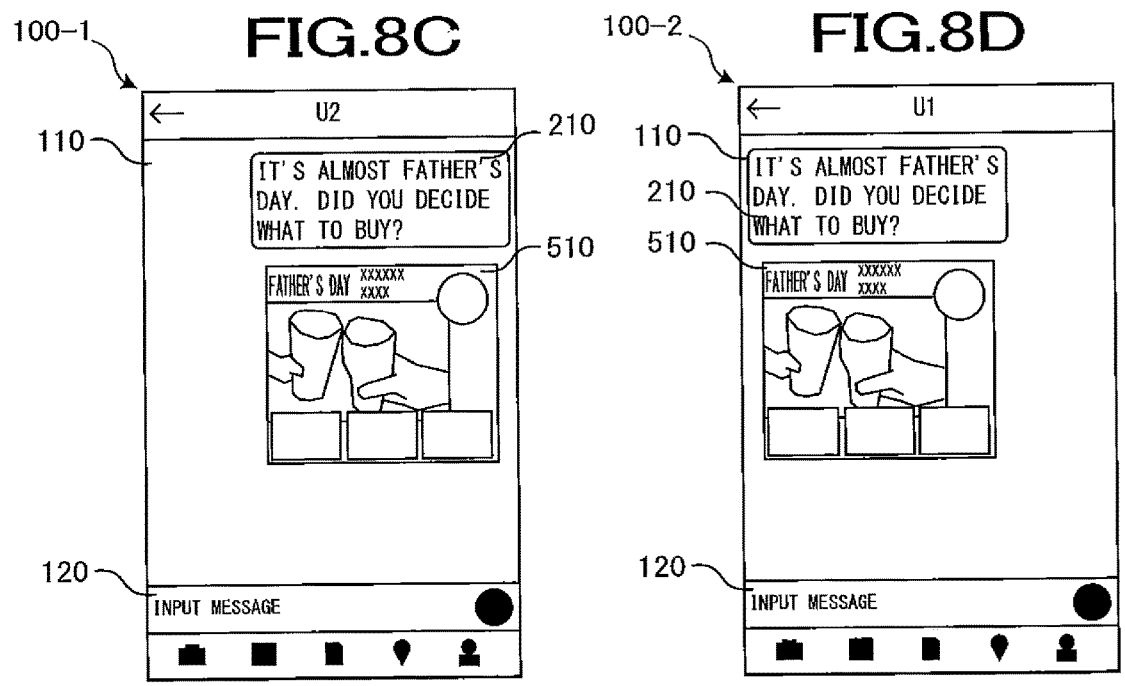

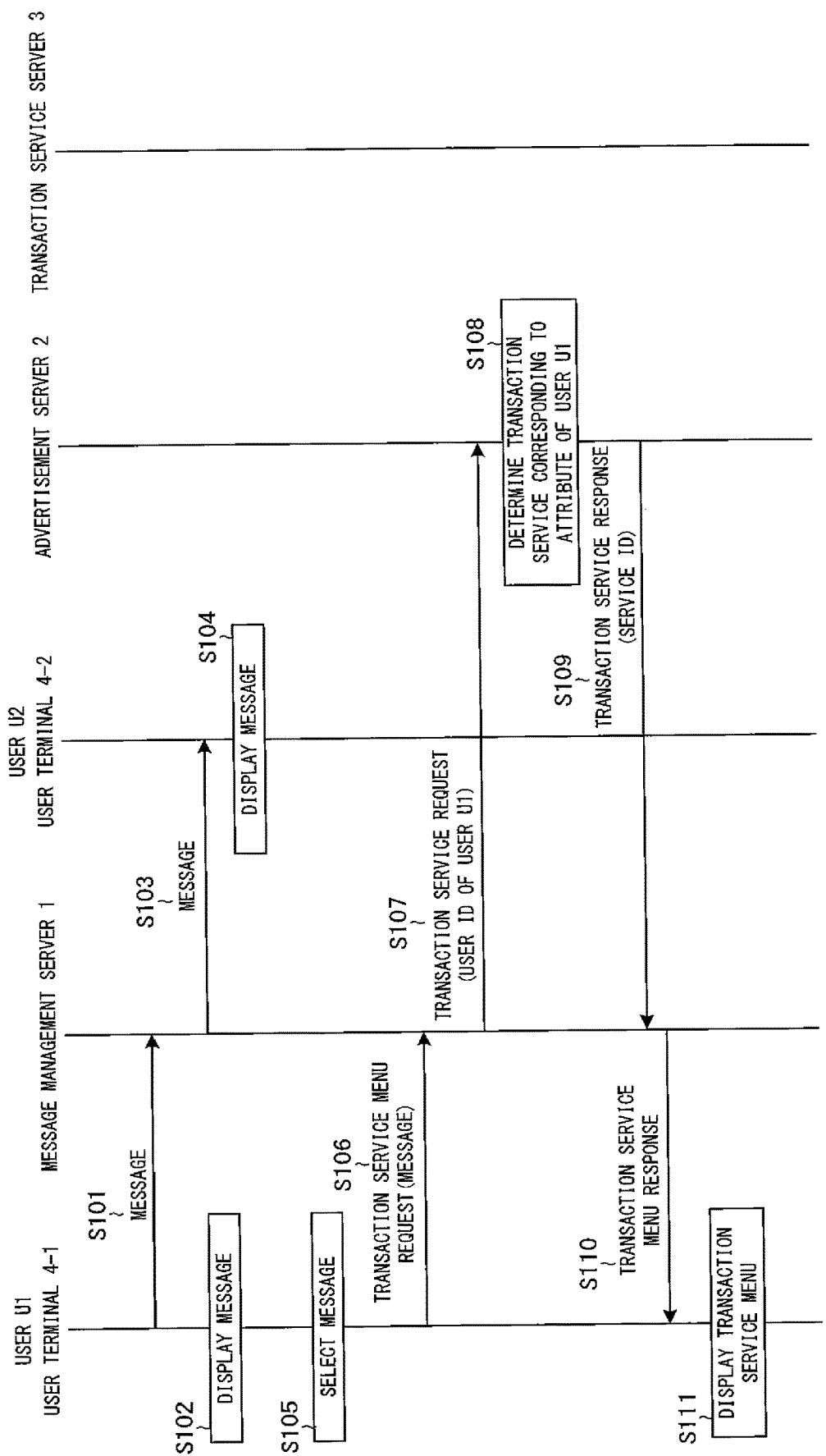

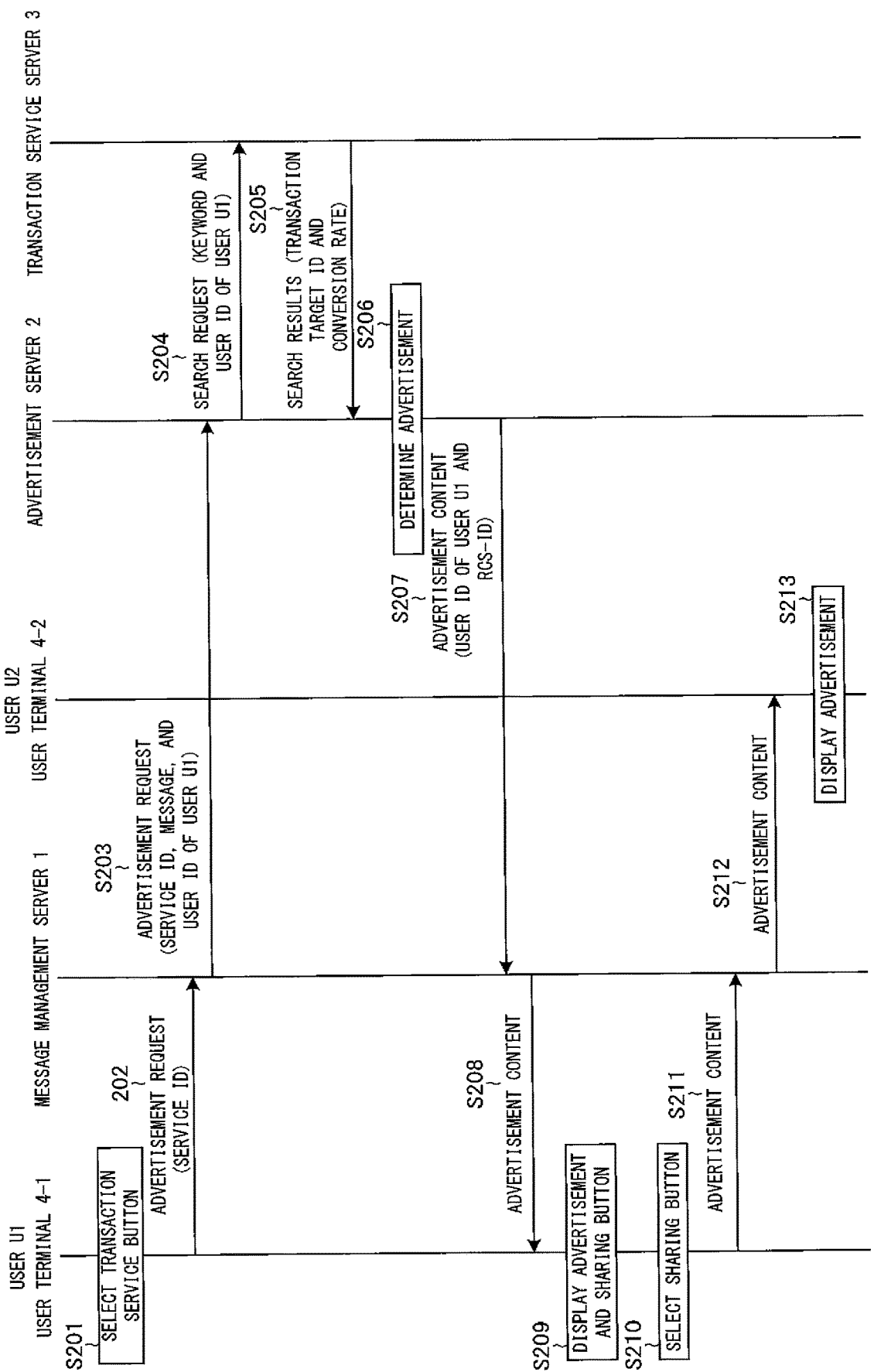

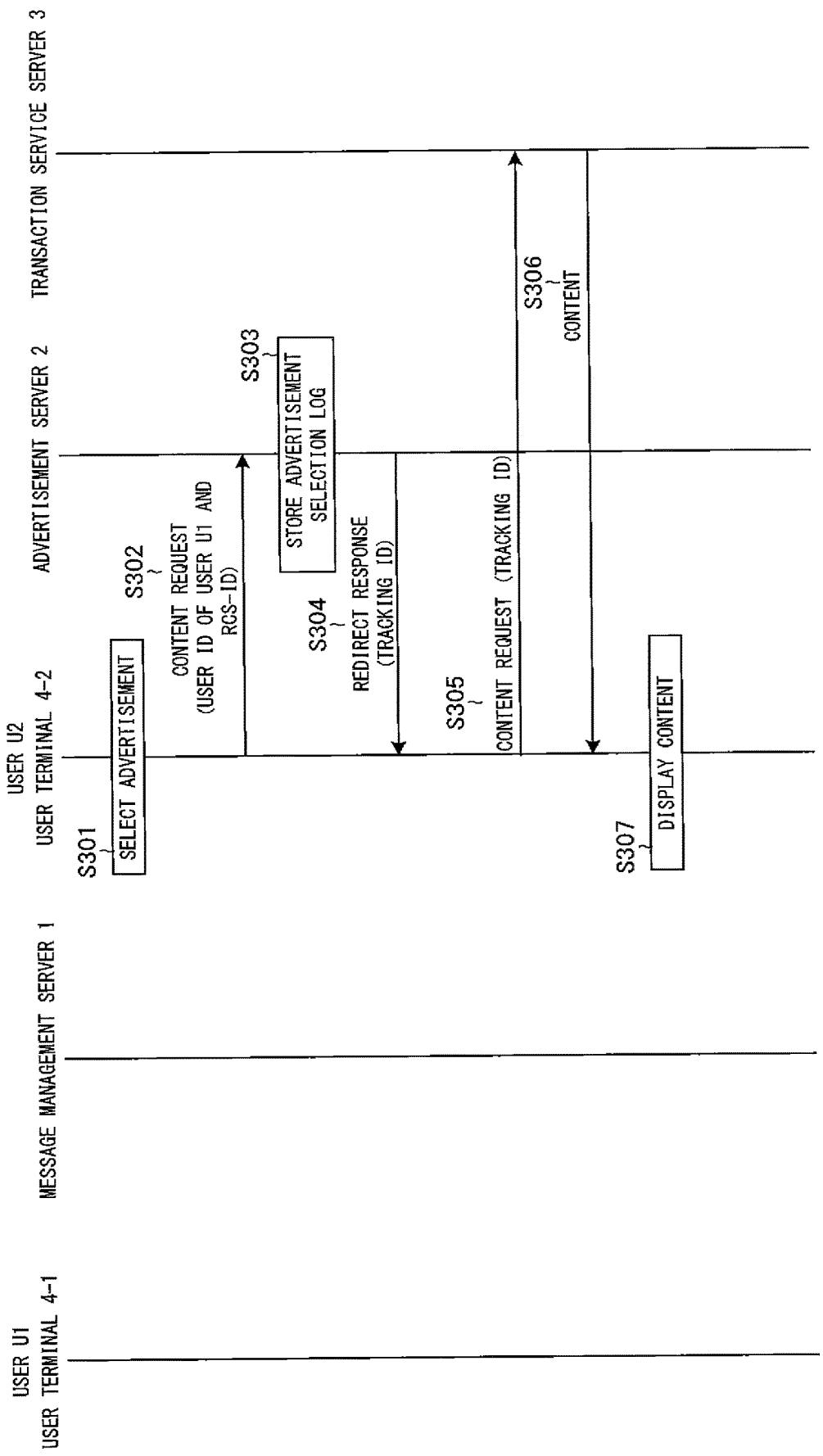

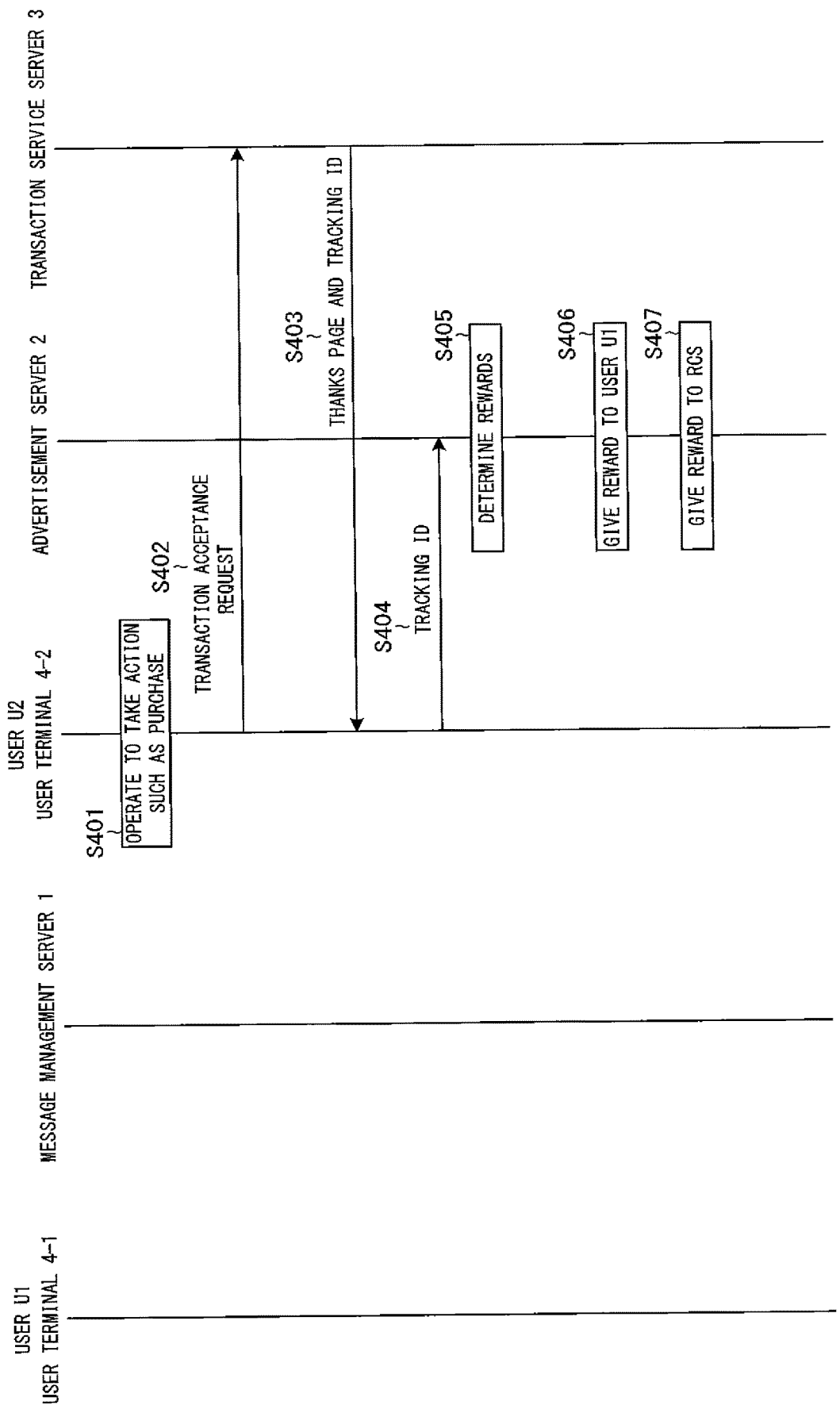

INFORMATION COMMUNICATION SYSTEM AND INFORMATION COMMUNICATION METHOD

CROSS-REFERENCE TO RELATED APPLICATION

This application claims priority to Japanese Patent Application No. 2020-214787 filed on Dec. 24, 2020, and the entire disclosure of which application including a specification, claims, drawings, and an abstract is incorporated herein by reference.

BACKGROUND

Technical Field

The present invention relates to a method for distributing an advertisement to terminal devices via a network.

Related Art

Conventionally, a system that distributes an advertisement through a network such as the Internet is known. In such a system, for example, the advertisement is displayed in content such as a web page and an e-mail. When a user selects the advertisement, for example, a terminal device of the user accesses a website in which information regarding an item for sale or a service corresponding to the advertisement is posted.

Furthermore, an affiliate advertisement is also known. For example, an affiliater creates and manages content of the website. The affiliater posts an advertisement in which a so-called affiliate link is embedded in the created content. When the user who views the content selects the advertisement, information for identifying the affiliater is recorded based on the affiliate link, and subsequent actions of the user is tracked. When the user takes an action such as ordering the item for sale corresponding to the advertisement or reserving the service corresponding to the advertisement, a reward will be given to the affiliater identified with the recorded information. For example, JP 2009-86854 A discloses a system that tracks a purchase route for an item for sale of a user who accesses the website based on an advertisement.

On the other hand, a rich communication service (RCS) and instant messaging are currently spreading. Generally, such a system provides a screen that displays exchanged messages to each of people with which the user exchanges messages. By using each screen, the user can exchange messages individually in real time like a chat. For example, JP 2006-191608 A discloses an instant messenger service system using a mobile communication terminal.

SUMMARY

It may be said that a message transmitted and received between the terminal devices is content created by a sender of the message. In a case where such an assumption is made, it is considered that there is certain validity in giving an affiliate reward to the sender of the message. However, in the conventional systems, the affiliate reward cannot be given to the sender of the message.

The present invention has been made in view of the above points, and an example of the object of the present invention is to provide an information communication system and an information communication method that enable a sender to acquire, by sending a message, an advertisement from which the sender can receive a reward for a successful result of the advertisement.

An aspect of the present invention is an information communication system comprising: at least one memory having computer program code stored thereon; and at least one processor configured to read the computer program code from the at least one memory and operate as instructed by the computer program code, the computer program code comprising: a first transmission code configured to cause at least one of the at least one processor to transmit an advertisement to a first terminal device used by a first user based on transmission of a message from the first terminal device to a second terminal device used by a second user; a display control code configured to cause at least one of the at least one processor to cause the first terminal device to display an operation part operable to transmit the advertisement transmitted by the first transmission code to the second terminal device; a second transmission code configured to cause at least one of the at least one processor to transmit the advertisement transmitted by the first transmission code to the second terminal device in response to operation of the displayed operation part by the first user; and a reward giving code configured to cause at least one of the at least one processor to execute processing of giving a reward to the first user based on recognition that the second user takes an action corresponding to a successful result of the advertisement transmitted by the second transmission code after the second user selects the advertisement.

Another aspect of the present invention is an information communication method performed by at least one computer, the method comprising: transmitting an advertisement to a first terminal device used by a first user based on transmission of a message from the first terminal device to a second terminal device used by a second user; causing the first terminal device to display an operation part operable to transmit the advertisement transmitted to the first terminal device to the second terminal device; transmitting the advertisement transmitted to the first terminal device to the second terminal device in response to operation of the displayed operation part by the first user; and executing processing of giving a reward to the first user based on recognition that the second user takes an action corresponding to a successful result of the advertisement transmitted to the second terminal device after the second user selects the advertisement.

BRIEF DESCRIPTION OF DRAWINGS

FIG. 3 is a diagram illustrating an example of information stored in a database of a message management server;

FIG. 4 is a block diagram illustrating an example of a schematic configuration of an advertisement server according to an embodiment;

FIG. 5 is a diagram illustrating an example of information stored in a database of an advertisement server;

FIGS. 8A to 8D are views illustrating examples of a screen transition;

FIG. 10 is a sequence diagram illustrating an example of an operation of an advertisement system according to an embodiment;

FIG. 11 is a sequence diagram illustrating an example of an operation of an advertisement system according to an embodiment;

FIG. 12 is a sequence diagram illustrating an example of an operation of an advertisement system according to an embodiment; and FIG. 13 is a sequence diagram illustrating an example of an operation of an advertisement system according to an embodiment.

DETAILED DESCRIPTION

Hereinafter, embodiments of the present invention will be described in detail with reference to the drawings.

1. Configuration of Advertisement System

Figure 1:
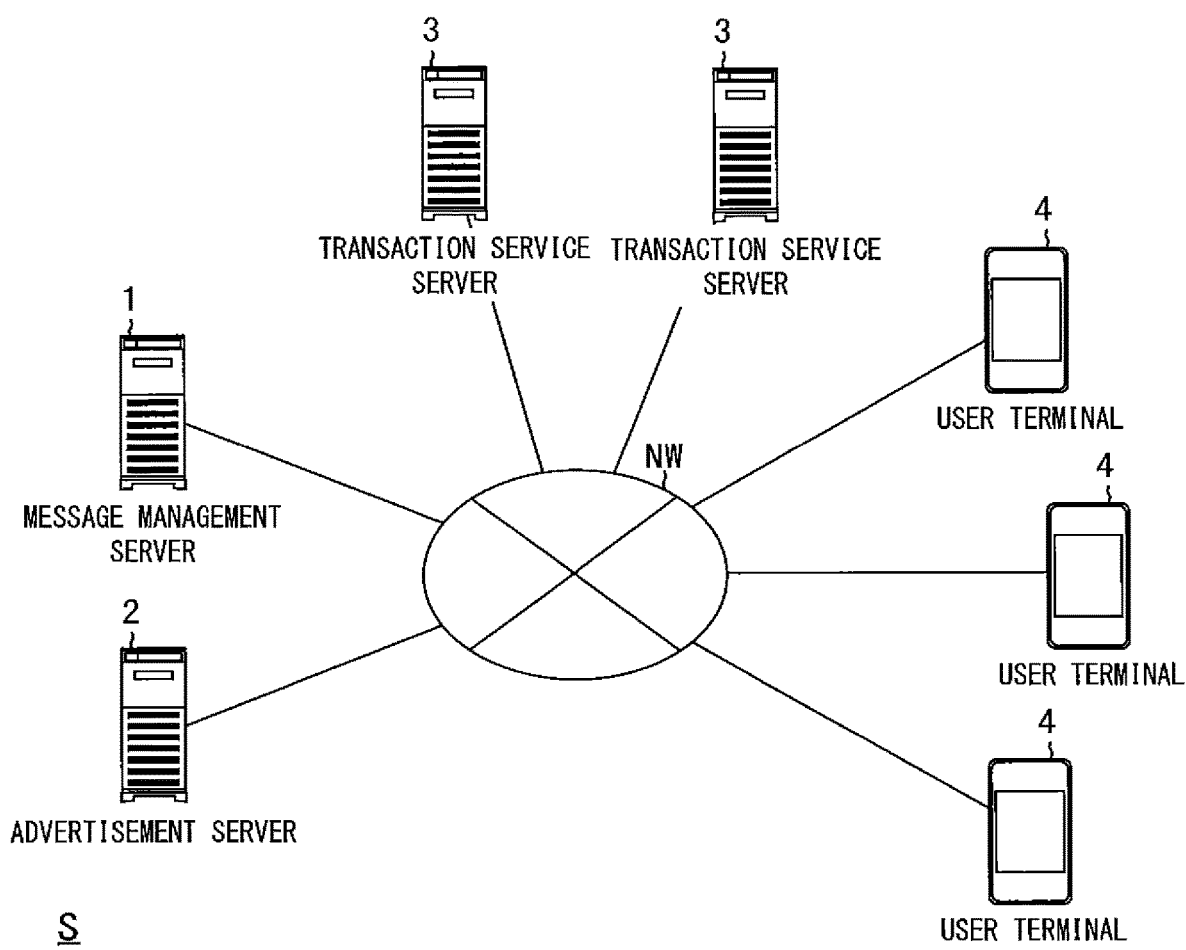
FIG. 1 is a diagram illustrating an example of a schematic configuration of an advertisement system corresponding to an embodiment.

First, a configuration and a functional outline of an advertisement system S according to the present embodiment will be described with reference to FIG. 1. FIG. 1 is a diagram illustrating an example of a schematic configuration of the advertisement system S according to the embodiment.

As illustrated in FIG. 1, the advertisement system S includes a message management server 1, an advertisement server 2, one or more transaction service servers 3, and a plurality of user terminals 4. The message management server 1, the advertisement server 2, the transaction service servers 3, and the user terminals 4 are connected to each other via a network NW. The network NW is constructed by, for example, the Internet, a dedicated communication line (for example, a community antenna television (CATV) line), a mobile communication network (including a base station and the like), a gateway, and the like. A combination of the message management server 1 and the advertisement server 2 is an example of an information communication system.

The message management server 1 is a server device for providing an RCS. For example, when a user selects another person with which the user will exchange messages, the message management server 1 causes a chat screen to be opened. The person selected by the user is identified with a telephone number of this person. The chat screen may be a screen for two or more users to exchange private messages with each other. For example, messages transmitted and received between two or more user terminals 4 may be displayed on the chat screen. The chat screen may be a screen for a chat room. When receiving a message from the user terminals 4 of a user who opens a chat screen, the message management server 1 transfers the message to one or more user terminals 4 of one or more other users associated with the chat screen. Basically, the message management server 1 transfers a message in real time. The message management server 1 can also transfer image data, multimedia content, and other data. Furthermore, the message management server 1 acquires advertisement content from the advertisement server 2 based on transmission of a message from any of the user terminals 4, and transmits, as an affiliate advertisement in which a sender of the message can receive a reward for a successful result, the advertisement content to the user terminal 4. The advertisement content may be multimedia content indicating an advertisement. Thereafter, based on the operation by the sender of the message, the message management server 1 transmits the advertisement content to the user terminal 4 of a receiver of the message. Accordingly, the advertisement is displayed on the user terminal 4 of the receiver of the message.

The advertisement server 2 is a server device for providing an advertisement content to the message management server 1. For example, the advertisement server 2 may determine an advertisement according to an attribute of the user who transmits the message by using the RCS and/or the message. Furthermore, the advertisement server 2 may determine the advertisement by executing so-called a real-time bidding based on an advertisement unit price or the like presented from advertisers. The advertisement unit price is an advertisement rate paid to an advertisement provider that manages the message management server 1 by the advertiser for a successful result of the advertisement per one time. Note that the advertisement provider and a provider of the RCS may be the same or different. Furthermore, the advertisement server 2 may be also operated as an affiliate service provider. Specifically, in a case where the receiver of the message in the RCS selects an advertisement displayed on the user terminal 4 and then takes an action corresponding to a successful result of the advertisement (that is, in a case where the conversion is made), the advertisement server 2 executes processing of giving a reward to the sender of the message. Examples of the action corresponding to the successful result of the advertisement include purchase of an item for sale, purchase of a service, reservation of a service, a membership registration, a material request, reservation of an appointment, and the like. Examples of the reward to be given include legal currency, electronic money, points, and the like. The points can be used by using a predetermined point program. For example, in a case where an item for sale is purchased or a service is used by using a predetermined site or a real shop, the points can be used as purchase money or money for a service fee. Note that the advertisement server 2 may include a server device that provides an advertisement and a server device that executes processing related to an affiliate. These server devices may be connected to each other via a network such as a local area network (LAN).

Each transaction service server 3 is a server device for providing a transaction service for a user of the user terminal 4 to transact a transaction target. The transaction target may be a transaction object. Examples of the transaction target include an item for sale and a service. Each transaction service server 3 may perform processing related to a website that provides a transaction service. In a case where there are a plurality of transaction service servers 3, these transaction service servers 3 may provide transaction services different from each other. Examples of the transaction service or the website provided by the transaction service server 3 include online shopping, an online shopping mall, hotel reservation, book sales, beauty salon reservation, delivery reservation, provision of real estate information, and the like. Each transaction service server 3 distributes content of the advertiser of the advertisement to be distributed to the user terminals 4 to the user terminals 4, and enables an action corresponding to a successful result of the advertisement. At least one business operator among a plurality of business operators who sell an item for sale or a service by using the transaction service provided by the transaction service server 3 may be an advertiser. In a case where a transaction target of only a provider itself is handled in the transaction service, the provider may be an advertiser.

Each of the user terminals 4 is a terminal device that can be carried by a user who uses the RCS. Each of the user terminals 4 may have a telephone function. Examples of the user terminal 4 include a portable information terminal such as a smartphone, a tablet computer, a mobile phone, and a personal digital assistant (PDA). As the user terminal 4, a stationary terminal device such as a personal computer may be used. An application dedicated to RCS may be installed in each of the user terminals 4. Furthermore, a web browser may be installed in each of the user terminals 4.

2. Device Configuration 2-1. Configuration of Message Management Server

Figure 2:
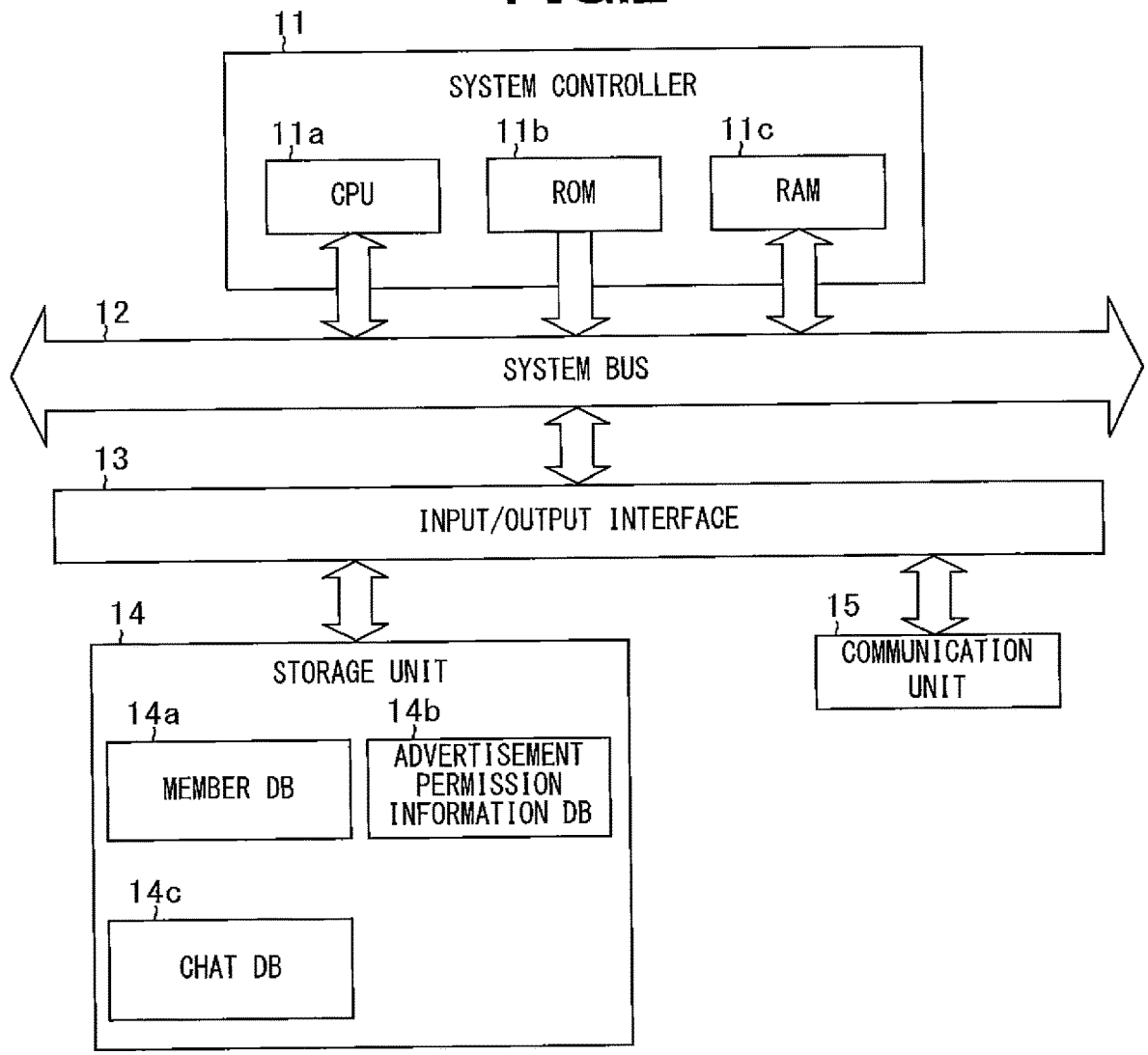
FIG. 2 is a block diagram illustrating an example of a schematic configuration of a message management server according to an embodiment.

Next, a configuration of the message management server 1 will be described with reference to FIGS. 2 and 3. FIG. 2 is a block diagram illustrating an example of a schematic configuration of the message management server 1 according to the embodiment. As illustrated in FIG. 2, the message management server 1 includes a system controller 11, a system bus 12, an input/output interface 13, a storage unit 14, and a communication unit 15. The system controller 11 and the input/output interface 13 are connected via the system bus 12.

The system controller 11 includes a central processing unit (CPU) 11*a*, a read only memory (ROM) 11*b*, and a random access memory (RAM) 11*c*.

The input/output interface 13 performs interface processing between the storage unit 14 and communication unit 15, and the system controller 11.

The storage unit 14 includes, for example, a hard disk drive or the like. The storage unit 14 stores databases such as a member DB 14*a*, an advertisement permission information DB 14*b*, and a chat DB 14*c*. "DB" is an abbreviation for database.

FIG. 3 is a diagram illustrating an example of information stored in the database of the message management server 1. In the member DB 14*a*, member information regarding a user who can use the RCS provided by the message management server 1 is stored for each user. For example, the member DB 14*a* stores, as the member information, a user ID, a name, a display name, a telephone number, the number of possessed points, and the like in association with each other. The user ID is identification information for identifying the user. The number of possessed points indicates the number of points currently possessed by the user.

In the advertisement permission information DB 14*b*, advertisement permission information indicating whether or not the user accepts the advertisement from the transaction service for each transaction service is stored for each user. Whether or not to accept the advertisement can be set by the user. Specifically, in the advertisement permission information DB 14*b*, the user ID and a permission state list are stored as the advertisement permission information in association with each other. The permission state list indicates whether or not the user indicated by the user ID accepts the advertisement for each transaction service.

In the chat DB 14*c*, chat information regarding a chat room created in the RCS is stored for each chat room. Specifically, in the chat DB 14*c*, a chat ID, a plurality of the user IDs, a chat history, and the like are stored in association with each other. The chat ID is identification information for identifying a target chat room. Each of the user IDs indicates a user who can enter the target chat room. Generally, the chat information includes user IDs for two persons. However, a chat room in which messages can be exchanged in a group of three or more persons may be capable of being created. In this case, the chat information includes user IDs for three or more persons. The chat history is a history of information exchanged in the chat room. For example, every time the information is transmitted, the chat history may include the information thereof, a user ID of the user who transmits the information, a transmission date and time for the information, and the like. Examples of the information to be transmitted include messages, images, multimedia data, and the like.

The storage unit 14 further stores various programs such as an operating system, a database management system (DBMS), and a message management server program. The message management server program is a program that causes the system controller 11 to execute various processing related to the RCS. For example, the message management server program may be acquired from other devices via the Internet NW, or may be recorded on a recording medium such as a magnetic tape, an optical disk, or a memory card, and read via a drive device.

The communication unit 15 includes, for example, a network interface card. The communication unit 15 is connected to the advertisement server 2, the transaction service server 3, and the user terminal 4 via the network NW, and controls a communication state with these devices.

2-2. Configuration of Advertisement Server

Next, a configuration of the advertisement server 2 will be described with reference to FIGS. 4 and 5. FIG. 4 is a block diagram illustrating an example of a schematic configuration of the advertisement server 2 according to the embodiment. As illustrated in FIG. 4, the advertisement server 2 includes a system controller 21, a system bus 22, an input/output interface 23, a storage unit 24, and a communication unit 25. The system controller 21 and the input/output interface 23 are connected via the system bus 22.

The system controller 21 includes a CPU 21*a*, a ROM 21*b*, a RAM 21*c*, or the like.

The input/output interface 23 performs interface processing between the storage unit 24 and communication unit 25, and the system controller 21.

The storage unit 24 includes, for example, a hard disk drive and the like. The storage unit 24 stores databases such as a user attribute DB 24*a*, an advertisement DB 24*b*, an advertisement selection history DB 24*c*, and a reward DB 24*d*.

FIG. 5 is a diagram illustrating an example of information stored in the database of the advertisement server 2. In the user attribute DB 24*a*, information indicating the attribute of the user who can use the RCS provided by the message management server 1 is stored for each user. Specifically, the user attribute DB 24*a* stores the user ID, user attribute information, and the like, in association with each other. The user attribute information indicates the attribute of the user indicated by the user ID. For example, for each transaction service, the user attribute information may indicate a click-through rate or a conversion rate about the target user through advertisements. The click-through rate in this case may be, for example, a ratio of the number of times the user selects the advertisement to the number of times the advertisement from a specific transaction service is displayed for the user in the RCS. The conversion rate in this case may be, for example, a ratio of the number of times the specific user takes an action corresponding to a successful result of the advertisement to the number of times the specific user visits the transaction service by selecting the advertisement from the specific transaction service in the RCS. The click-through rate or the conversion rate indicates a degree to which the user is interested in the transaction service, a degree to which the user likes the transaction service, a degree to which the user uses the transaction service, or a degree to which the user performs transaction in the transaction service. Therefore, it can be said that these information indicate the attribute of the user. The click-through rate and the conversion rate may be calculated by the advertisement server 2 by using, for example, the advertisement selection history DB 24*c*, the reward DB 24*d*, or the like. Furthermore, for example, the user attribute information may indicate age, gender, a residential area, an occupation, and the like of the user. These information may be input by the user from, for example, the application for RCS.

In the advertisement DB 24*b*, advertisement information regarding an advertisement to be distributed to the user terminals 4 of the users using the RCS is stored for each advertisement. Specifically, the advertisement DB 24*b* stores an advertisement ID, a service ID, an advertiser ID, a transaction target ID, an advertisement image, an advertisement unit price, a link destination uniform resource locator (URL), and the like in association with each other. The advertisement ID is identification information for identifying a target advertisement. The service ID is identification information for identifying the transaction service. The service ID included in the advertisement information indicates a transaction service in which a transaction target advertised by the target advertisement can be transacted. That is, the service ID indicates a transaction service to be an access destination of the user in a case where the target advertisement is selected. The advertiser ID is identification information for identifying the advertiser of the target advertisement. The transaction target ID is identification information for identifying a transaction target advertised by the target advertisement. The advertisement image is an image indicating the target advertisement. The advertisement unit price may be, for example, a cost per acquisition (CPA). The link destination URL is a URL of content of the web page or the like on which information of the transaction target advertised by the target advertisement is posted. When the user selects the advertisement, the user terminal 4 accesses and displays the content indicated by the link destination URL.

The advertisement selection history DB 24*c* stores a history of an advertisement selection by the user using the RCS. Specifically, the advertisement selection history DB 24*c* stores, as an advertisement selection log, a tracking ID, a selection date and time, the advertisement ID, the service ID, an RCS-ID, the chat ID, a selection user ID, an affiliater ID, and the like in association with each other every time an advertisement is selected. The tracking ID is identification information for tracking actions of the user after the advertisement is selected. The selection date and time indicates date and time when the advertisement is selected. The advertisement ID indicates the selected advertisement. The service ID indicates a transaction service in which a transaction target advertised by the selected advertisement can be transacted. The RCS-ID is identification information for identifying the RCS. The RCS-ID included in the advertisement selection log indicates which RCS the user uses to select an advertisement. In the advertisement system S, at least one RCS provided by the message management server 1 can be used. However, in the advertisement system S, a plurality of different RCSs may be provided by a plurality of the message management servers 1. Then, the user may be able to use one or more RCSs desired by the user among a plurality of the RCSs. The chat ID indicates a chat room screen that was open when an advertisement was selected. The selection user ID indicates the user who selects the advertisement. The affiliater ID is a user ID of a user to which a reward for a successful result is given in a case where the user who selects the advertisement takes an action corresponding to the successful result of the selected advertisement (in a case where the conversion is made).

In a case where the conversion is made by the user using the RCS, the reward DB 24*d* stores reward information regarding the reward given for the successful result of the advertisement every time the conversion is made. Specifically, the reward DB 24*d* stores a conversion ID, a conversion-made date and time, the tracking ID, the RCS-ID, the chat ID, a transaction user ID, the affiliater ID, an affiliater reward amount, an RCS reward amount, and the like in association with each other. The conversion ID is identification information for identifying the conversion. The conversion-made date and time indicates the date and time when the conversion is made. The tracking ID is identification information used for tracking the action corresponding to the successful result of the advertisement. The RCS-ID indicates an RCS that the user used when the user selected the advertisement, before the user took the action corresponding to the successful result of the advertisement. The chat ID indicates a chat room screen that was open when the user who took the action corresponding to the successful result of the advertisement selected the advertisement. The transaction user ID is a user ID of the user who took the action corresponding to the successful result of the advertisement. The affiliater ID is a user ID of a user to which the reward for the successful result of the advertisement is given. The affiliater reward amount indicates the amount of the reward given to the user indicated by the affiliater ID. The RCS reward amount indicates the amount of the reward given to the provider of the RCS indicated by the RCS-ID.

The storage unit 24 further stores various programs such as an operating system, a DBMS, and an advertisement server program. The advertisement server program is a program that causes the system controller 21 to execute various processing related to the provision of the advertisement and the affiliate. For example, the advertisement server program may be acquired from other devices via the Internet NW, or may be recorded on a recording medium such as a magnetic tape, an optical disk, or a memory card, and read via a drive device.

The communication unit 25 includes, for example, a network interface card. The communication unit 25 is connected to the message management server 1, the transaction service server 3, and the user terminal 4 via the network NW, and controls a communication state with these devices.

3. Functional Overview 3-1. Message Management Server

Figure 6:
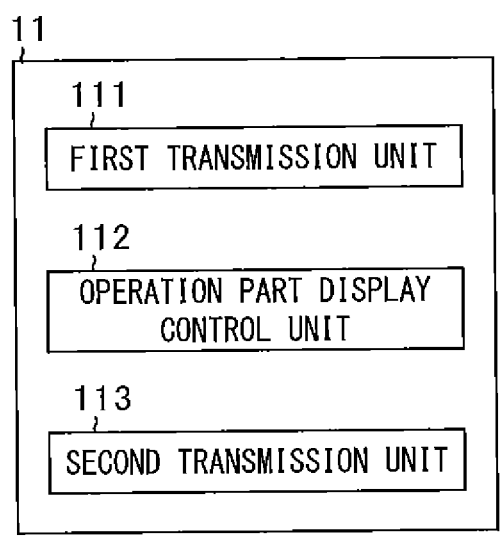
FIG. 6 is a diagram illustrating an example of a functional block of a system controller of a message management server.

Next, a functional overview of the system controller 11 in the message management server 1 will be described with reference to FIGS. 6 to 8D. FIG. 6 is a diagram illustrating an example of a functional block of the system controller 11 of the message management server 1. When the CPU 11*a* reads and executes various program codes included in the message management server program, the system controller 11 functions as a first transmission unit 111, an operation part display control unit 112, a second transmission unit 113 and so forth as illustrated in FIG. 6.

The first transmission unit 111 transmits an advertisement to a first user terminal 4 based on transmission of a message from the first user terminal 4 used by a first user to a second user terminal 4 used by another second user. Here, the first user is referred to as a user U1, and the second user is referred to as a user U2. Furthermore, the first user terminal 4 is referred to as a user terminal 4-1, and the second user terminal 4 is referred to as a user terminal 4-2. In a case where a group of three or more persons chats, there may be two or more user terminals 4-2.

The advertisement transmitted to the user terminal 4-1 is an advertisement in which the user U1 can receive the reward for the successful result. The first transmission unit 111 may transmit, to the user terminal 4-1, an advertisement with a user ID indicating the user U1 as a user to which the reward is given. Based on the user ID attached to the advertisement, the user to which the reward is given is identified as will be described later. For example, the first transmission unit 111 may transmit advertisement content as multimedia content. The advertisement content may include at least control data that can describe information, such as a hypertext markup language (HTML) document or a script, and an image of the advertisement. This control data may include a tag, an instruction, or the like that causes the user terminal 4-1 to display the image of the advertisement. Furthermore, the control data may include an affiliate link. The affiliate link may be a link for causing the user terminal 4 to access content of the transaction target corresponding to the advertisement in the transaction service in a case where the advertisement is selected, and for identifying a user to which the reward for the successful result is given in a case where an action corresponding to the successful result of the advertisement is taken. For example, the affiliate link may include the user ID of the user U1 and the link destination URL. The advertisement transmitted to the user terminal 4-1 may be an advertisement in which a provider (that is, the party managing the message management server 1) of an RCS system that transmitted the message from the user terminal 4-1 to the user terminal 4-2 can receive the reward for the successful result. In this case, the affiliate link may further include information for identifying the provider of the RCS. This information may be, for example, an RCS-ID or a chat ID of a chat room corresponding to a chat screen on which the message exchanged between the user U1 and the user U2 is displayed.

Since the message is transmitted with a protocol of the RCS, the message management server 1 receives the message input by the user U1 from the user terminal 4-1 and transfers the message to the user terminal 4-2. At this time, the first transmission unit 111 may transmit the advertisement to the user terminal 4-1.

Alternatively, after transmitting the message, the first transmission unit 111 may transmit the advertisement to the user terminal 4-1 based on operation by the user U1. According to this, the user U1 can determine whether or not to receive the advertisement. In the user terminal 4-1, the message input by the user U1 and transmitted from the user terminal 4-1 to the user terminal 4-2 is displayed on the chat screen on which the message exchanged between the user U1 and the user U2 is displayed. The message management server 1 may transmit the advertisement to the user terminal 4-1 based on selection of the message displayed on the message screen by the user U1. The first transmission unit 111 may transmit the advertisement to the user terminal 4-1 only in a case where the latest message transmitted from the user terminal 4-1 is selected. Alternatively, as long as the message is transmitted from the user terminal 4-1, the first transmission unit 111 may transmit the advertisement to the user terminal 4-1 even in a case where any message is selected.

The first transmission unit 111 may acquire the content of the advertisement to be transmitted to the user terminal 4-1 from the advertisement server 2. The advertisement transmitted to the user terminal 4-1 may be any advertisement. Alternatively, the first transmission unit 111 may transmit the advertisement corresponding to an attribute of the user U1 to the user terminal 4-1. It is estimated that the user U1 and the user U2 are in a relationship of exchanging the messages between them. Therefore, there is a possibility that a common characteristic exists between the user U1 and the user U2. For example, there is a possibility that the user U1 and the user U2 have common preferences and concerns. As described above, when the user U2 has the same attribute as the attribute of the user U1, the effect of the advertisement can be increased. Furthermore, as will be described later, the user U1 may select the advertisement transmitted to the user terminal 4-1 so that the transaction service can be selected, and then the user U1 may be capable of taking an action corresponding to the successful result of the advertisement. In this case, the advertisement corresponding to the user U1 is provided to the user U1, so that the successful result of the advertisement can be increased. For example, the first transmission unit 111 may transmit the user ID of the user U1 to the advertisement server 2. As will be described later, the advertisement server 2 may transmit the advertisement corresponding to the attribute of the user U1 indicated by the user ID to the message management server 1. Examples of the advertisement corresponding to the attribute of the user U1 will be described later.

Furthermore, the first transmission unit 111 may transmit the advertisement related to the message transmitted from the user terminal 4-1 to the user terminal 4-2 to the user terminal 4-1. For example, the first transmission unit 111 may transmit the advertisement related to the latest message. For example, the first transmission unit 111 may transmit the transmitted message to the advertisement server 2. In a case where the advertisement is transmitted based on selection of a message from the chat screen by the user U1, the first transmission unit 111 may transmit the selected message to the advertisement server 2. As will be described later, based on the message received from the message management server 1, the advertisement server 2 may transmit the advertisement related to the message to the message management server 1. Examples of the advertisement related to the message will be described later.

The operation part display control unit 112 causes the user terminal 4-1 to display an operation part operable to transmit the advertisement transmitted by the first transmission unit 111 to the user terminal 4-2. The operation part is not particularly limited as long as the operation part is a user interface part capable of performing operation such as selection. Examples of the operation part include a button, a link, an icon, and the like. For example, the operation part may be a button referred to as a sharing button. The sharing button is a button for the user U1 to share the advertisement with the user U2. There are various methods for displaying the operation part. For example, in a case where the application for RCS provides a function of displaying this operation part, the operation part display control unit 112 may transmit a request for display of the operation part to the user terminal 4-1 when the advertisement is transmitted to the user terminal 4-1. Alternatively, the application for RCS may provide a function of displaying a user interface such as a customizable menu based on data in a predetermined format such as HTML. In this case, the operation part display control unit 112 may transmit data for displaying the operation part to the user terminal 4-1 and cause the user terminal 4-1 to display the operation part based on the data.

In response to operation of the operation part displayed by the user terminal 4-1 by the user U1, the second transmission unit 113 transmits the advertisement transmitted to the user terminal 4-1 by the first transmission unit 111 to the user terminal 4-2. For example, the user terminal 4-1 may transmit the advertisement to the message management server 1, and the message management server 1 may transfer the message to the user terminal 4-2. For example, the second transmission unit 113 may transmit the advertisement to the user terminal 4-2 by using the same protocol as the protocol for transmitting the message from the user terminal 4-1 to the user terminal 4-2 in the RCS. Accordingly, the first transmission unit 111 may cause the advertisement to be displayed on the chat screen of the user terminal 4-2. Here, the transmitted advertisement may also be displayed on the chat screen of the user terminal 4-1. Alternatively, the second transmission unit 113 may transmit the advertisement by using another protocol. Furthermore, the advertisement may be displayed on a screen other than the chat screen.

Only in a case where the advertisement transmitted to the user terminal 4-1 by the first transmission unit 111 is an advertisement from the transaction service preset to accept the advertisement by the user U2, the second transmission unit 113 may transmit the advertisement to the user terminal 4-2. For example, the second transmission unit 113 may determine whether to transmit the advertisement to the user terminal 4-2 with reference to advertisement permission information of the user U2. Accordingly, it is possible to block the advertisement from a transaction not desired by the user U2.

Figure 7A:
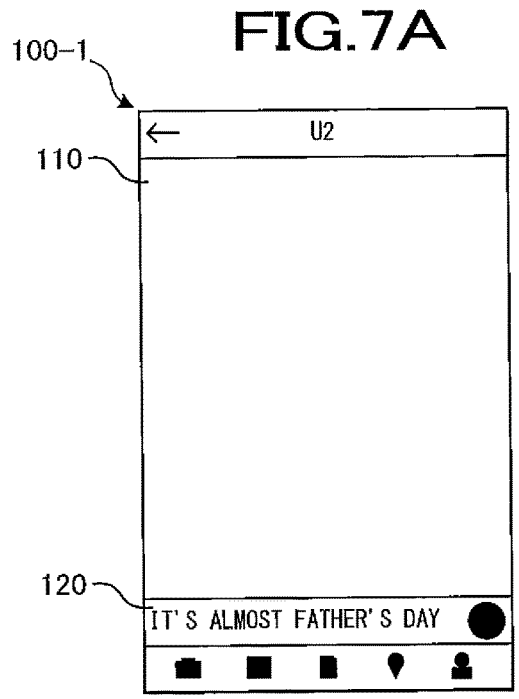
FIGS. 7A to 7D are views illustrating examples of a screen transition.
Figure 7B:
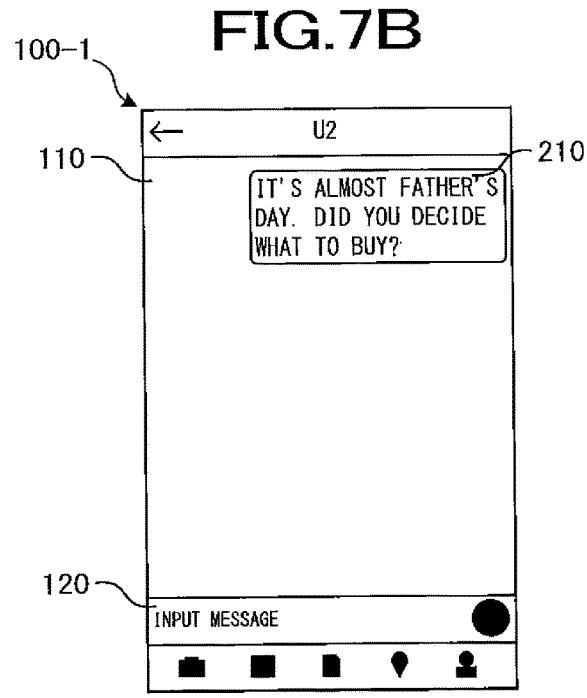
Figure 7C:
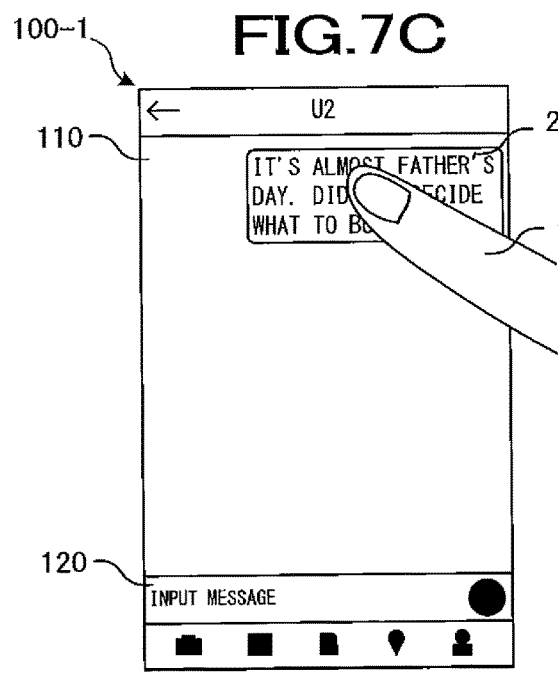
Figure 7D:
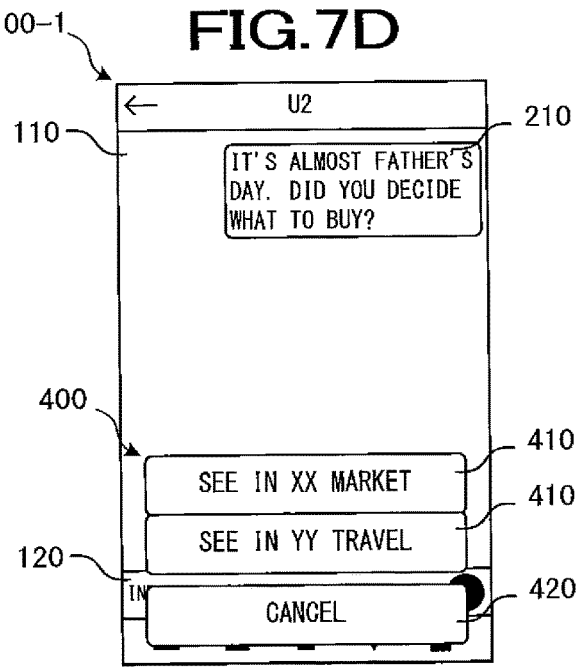

Next, an example of a screen transition related to an advertisement display will be described. FIGS. 7A to 8D are views illustrating examples of the screen transition. The user U1 selects the user U2 as a message transmission destination in the application for RCS. In response to this, the user terminal 4-1 displays a chat screen 100-1 as illustrated in FIG. 7A. The chat screen 100-1 includes a message display area 110, and a message input field 120. The message display area 110 is an area in which transmitted and received messages are displayed. The message input field 120 is an area for inputting a message. Here, the user U1 inputs a message in the message input field 120. For example, a message "It's almost Father's day. Did you decide what to buy?" is input. Then, the user U1 selects transmission of the message. In response to this, the user terminal 4-1 transmits the message and displays the input message 210 in the message display area 110 as illustrated in FIG. 7B. Here, the user U1 selects the message 210 with a finger 310 as illustrated in FIG. 7C. In response to this, the user terminal 4-1 displays a transaction service menu 400 on the chat screen 100-1 as illustrated in FIG. 7D. The transaction service menu 400 is a menu for selecting a transaction service for displaying an advertisement. The transaction service menu 400 includes one or more transaction service buttons 410 and a cancel button 420. Each of the transaction service buttons 410 may display a name of the transaction service corresponding to the button. Each of the transaction service buttons 410 is a button for displaying the advertisement from the transaction service corresponding to the button. For example, the transaction service button 410 may be displayed for all transaction services. Alternatively, the transaction service button 410 may be displayed for one or more transaction services corresponding to the attribute of the user U1. The cancel button 420 is a button for canceling the selection of the transaction service and not displaying the advertisement. Note that the message management server 1 may automatically determine the transaction service for acquiring the advertisement. In this case, when the message is selected, the user terminal 4-1 may display the advertisement without displaying the transaction service menu 400.

When the user U1 selects any of the transaction service buttons 410 from the transaction service menu 400, the user terminal 4-1 displays an advertisement 510 and a sharing button 520 as illustrated in FIG. 8A. The advertisement 510 is an advertisement from the transaction service selected in the transaction service menu 400. Furthermore, the advertisement 510 may be an advertisement related to the message 210, for example, an advertisement related to Father's Day. Here, when the user U1 selects the advertisement 510, the user terminal 4-1 accesses the transaction service server 3 of the transaction service selected in the transaction service menu 400 according to the affiliate link, and displays content of a transaction target advertised by the advertisement 510, for example, a web page. For example, the user terminal 4-1 may display the content according to the web browser. Alternatively, in a case where the application for RCS provides a function of the web browser, the user terminal 4-1 may display the content according to the application. Thereafter, the user U1 can take an action corresponding to a successful result of the advertisement 510, such as purchase of an item for sale or reservation of a service. However, in this case, no reward is given to the user U1. On the other hand, the reward may be given to the provider of the RCS.

As illustrated in FIG. 8B, when the user U1 selects the sharing button 520, the user terminal 4-1 transmits the advertisement 510 to the user terminal 4-2 via the message management server 1. Then, as illustrated in FIG. 8C, the user terminal 4-1 displays the transmitted advertisement 510 in the message display area 110 of the chat screen 100-1. On the other hand, the user U2 opens a chat screen 100-2 as illustrated in FIG. 8D. The chat screen 100-2 is a chat screen for displaying the messages exchanged between the user U2 and the user U1. The chat screen 100-2 also includes the message display area 110, and the message input field 120. As illustrated in FIG. 8D, the user terminal 4-2 displays the message 210 and the advertisement 510, which are received from the user terminal 4-1, in the message display area 110 of the chat screen 100-2. Here, when the user U2 selects the advertisement 510, the user terminal 4-2 displays the content of the transaction target advertised by the advertisement 510. Thereafter, when the user U2 takes an action corresponding to the successful result of the advertisement 510, the reward is given to the user U1. Moreover, the reward may be given to the provider of the RCS.

3-2. Advertisement Server

Figure 9:
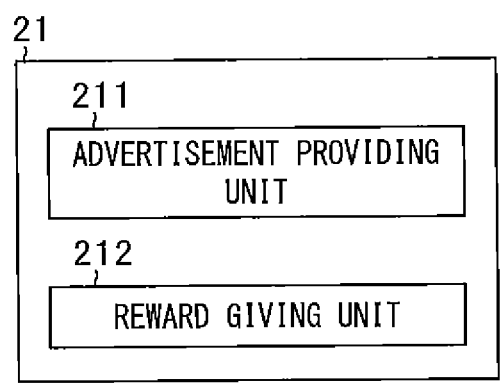
FIG. 9 is a diagram illustrating an example of a functional block of a system controller of an advertisement server.

Next, a functional overview of the system controller 21 of the advertisement server 2 will be described with reference to FIG. 9. FIG. 9 is a diagram illustrating an example of a functional block of the system controller 21 of the advertisement server 2. By the CPU 21a reads and executes various program codes included in the advertisement server program, the system controller 21 functions as an advertisement providing unit 211, and a reward giving unit 212 as illustrated in FIG. 9.

The advertisement providing unit 211 acquires an advertisement to be provided to the message management server 1 as the advertisement to be transmitted from the message management server 1 to the user terminal 4-1. For example, the advertisement providing unit 211 may randomly determine an advertisement to be acquired or may acquire a predetermined advertisement.

Alternatively, the advertisement providing unit 211 may acquire an advertisement corresponding to the attribute of the user U1. Examples of the advertisement corresponding to the attribute of the user include, for example, an advertisement of a transaction target the user is estimated to be interested in, an advertisement of a transaction target having a high purchase frequency of the user, an advertisement of a transaction target in a transaction service having a high use frequency of the user, and an advertisement in which the attribute of the user matches with a condition designated by the advertiser. For example, the advertisement providing unit 211 may determine an advertisement to be provided based on the user attribute information of the user U1 stored in the user attribute DB 24a. For example, in a case where the user attribute information indicates a conversion rate for each transaction service for the user U1, the advertisement providing unit 211 may determine the transaction service having a relatively high conversion rate. Then, the advertisement providing unit 211 may acquire the content of the advertisement associated with the service ID of the determined transaction service from the advertisement DB 24b.

Furthermore, for example, for each advertisement, the advertisement DB 24b may store a condition of the attribute of users to whom the advertisement is presented. This condition may include, for example, gender, age, a residential area, an occupation, and the like. This condition may be set by the advertiser. In this case, the advertisement providing unit 211 may acquire data of the advertisement in which the attribute indicated by the user attribute information meets the condition from the advertisement DB 24b.

Furthermore, for example, the advertisement providing unit 211 may acquire information regarding a transaction target corresponding to the attribute of the user U1 from the transaction service server 3. Then, the advertisement providing unit 211 may determine an advertisement to be provided based on the acquired information. For example, the advertisement providing unit 211 may transmit information for identifying the user U1 in the transaction service server 3 to the transaction service server 3. The transaction service server 3 may transmit information regarding a transaction target corresponding to the attribute of the user indicated by the transmitted information to the advertisement server 2. The information for identifying the user may be, for example, a user ID in the RCS. In a case where the information for identifying the user U1 in the transaction service server 3 is different from the user ID in the RCS, the information and the user ID may be stored in the storage unit 14 in association with each other. In this case, the advertisement providing unit 211 may transmit the information associated with the user ID of the user U1 to the transaction service server 3. In the transaction service server 3, for each user who uses the corresponding transaction service, a conversion rate about the user may be stored for each transaction target, for each category of the transaction target, or for each advertiser. The conversion rate in this case may be, for example, a ratio of the number of times the user takes an action corresponding to the successful result of the advertisement of the transaction target (or any transaction target belonging to the category of the transaction target, or any transaction target handled by an advertiser that sells the transaction target) corresponding to the advertisement, to the number of times the user visits the transaction service by selecting the advertisement. For example, the transaction service server 3 may calculate the conversion rate as needed. This conversion rate may be calculated in consideration of not only the advertisement displayed in the RCS but also the advertisement displayed in other systems. The transaction service server 3 may determine one or more transaction targets having a relatively high conversion rate. The transaction service server 3 may transmit the transaction target ID of the determined transaction target to the message management server 1. At this time, the transaction service server 3 may transmit the conversion rate corresponding to the transaction target ID together with the transaction target ID.

The advertisement providing unit 211 may acquire the advertisement related to the message transmitted from the user terminal 4-1 to the user terminal 4-2. The advertisement related to the message may be, for example, an advertisement of the transaction target or the advertiser related to the message or a word included in the message, or the advertisement itself may be an advertisement related to the message or the word. For example, the advertisement providing unit 211 may divide the message into morphemes by using morphological analysis. Then, the advertisement providing unit 211 may extract, for example, a noun and the like among the morphemes as a keyword. Furthermore, for example, the advertisement DE 24b may store, for each advertisement, keywords related to the advertisement, the advertiser, or the transaction target. These keywords may be set by, for example, the advertiser. Then, the advertisement providing unit 211 may acquire the content of the advertisement associated with at least one keyword matching with the at least one keyword included in the transmitted message from the advertisement DB 24b. Alternatively, by transmitting the message transmitted from the user terminal 4-1 to the user terminal 4-2 or the at least one keyword included in the message to the transaction service servers 3, the advertisement providing unit 211 may acquire the advertisement related to the message from the transaction service servers 3. For example, the transaction service server 3 may store, for each transaction target, content information indicating content such as a web page that can be distributed to the user terminal 4. The content information may include, for example, a name or a title of each transaction target and information regarding a text described in the content. The content information may be, for example, an HTML document or the like for displaying the web page. For example, the transaction service server 3 may search for one or more transaction targets on which the content information includes the at least one keyword transmitted from the advertisement server 2. Then, the transaction service server 3 may transmit the transaction target ID of the found transaction target to the message management server 1.

In a case where there is a plurality of candidates for the advertisement to be provided to the message management server 1, the advertisement providing unit 211 may determine the advertisement to be provided by executing, for example, so-called real-time bidding. For example, the message management server 1 may acquire an advertisement unit price for each of the candidates from the advertisement DB 24b and determine the advertisement having the highest advertisement unit price as the advertisement to be provided. In a case where the conversion rate is acquired for each advertisement from the transaction service server 3, the advertisement providing unit 211 may determine the advertisement to be provided based on the advertisement unit price and the conversion rate. For example, the advertisement providing unit 211 may calculate a score by substituting the advertisement unit price and the conversion rate into a predetermined calculation formula. Then, the advertisement providing unit 211 may determine the advertisement having the highest score as the advertisement to be provided. For example, the advertisement providing unit 211 may calculate the score so that the higher the advertisement unit price, the higher the score, and the higher the conversion rate, the higher the score.

When the advertisement is determined, the advertisement providing unit 211 attaches the user ID of the user U1 to the advertisement and transmits the advertisement to the message management server 1. For example, the advertisement providing unit 211 may generate control data for displaying the advertisement. The advertisement providing unit 211 may transmit the advertisement content including the control data and the advertisement image. The control data may include a tag or an instruction for displaying the image of the advertisement. Furthermore, the control data may include the affiliate link. The affiliate link may include the user ID of the user U1, the advertisement ID corresponding to the determined advertisement, and the link destination URL. Furthermore, the affiliate link may include at least one of the RCS-ID or the chat ID. Furthermore, for example, the affiliate link may include a URL assigned to the advertisement server 2. In this case, when the user selects the advertisement, the affiliate link may be generated so that the user terminal 4 first accesses the advertisement server 2. The advertisement server 2 redirects the access from the user terminal 4, so that the user terminal 4 accesses information indicated by the link destination URL.

The reward giving unit 212 executes processing of giving a reward to the user U1 based on recognition that the user U2 takes an action corresponding to the successful result of the advertisement after the user U2 selects the advertisement transmitted by the second transmission unit 113 of the message management server 1. To the advertisement transmitted by the second transmission unit 113, the user ID of the user U1 is added as the affiliater ID. According to selection of the advertisement by the user U2, the user ID added to the advertisement is transmitted from the user terminal 4-2 and stored. Thereafter, in response to the action taken by the user U2 corresponding to the successful result of the advertisement, the reward giving unit 212 may acquire the stored user ID and identify the user to which the reward is given based on the acquired user ID.

For example, the user ID of the user U1 may be transmitted from the user terminal 4-2 to the advertisement server 2. For example, the user terminal 4-2 accesses the advertisement server 2 according to the affiliate link included in the advertisement. At this time, the reward giving unit 212 may acquire the user ID of the user U1. The reward giving unit 212 may store the acquired user ID in the advertisement selection history DB 24c as the affiliater ID. Alternatively, the reward giving unit 212 may transmit the acquired user ID to the user terminal 4-2 as a cookie of the advertisement server 2. Accordingly, the user ID of the user U1 may be stored in the user terminal 4-2. The reward giving unit 212 may generate a new tracking ID and store the tracking ID in the advertisement selection history DB 24c in association with the user ID of the user U1. Then, the reward giving unit 212 may transmit a response including the tracking ID to the user terminal 4-2. Accordingly, the reward giving unit 212 may transmit a request including the tracking ID from the user terminal 4-2 to the transaction service servers 3 by performing the redirect. Then, the tracking ID may be stored by the transaction service server 3. Alternatively, the tracking ID may be transmitted to the user terminal 4-2 as a cookie of the transaction service server 3 and stored in the user terminal 4-2. In the transaction service, when the user completes the action corresponding to the successful result of the advertisement, a thanks page is displayed. The thanks page is one of the contents. Information for notifying the advertisement server 2 that the conversion is made is embedded in the thanks page. The information to be embedded may be, for example, a so-called conversion tag or a program. When the user U2 takes the action corresponding to the successful result of the advertisement, the transaction service server 3 transmits the thanks page to the user terminal 4-2. The user terminal 4-2 transmits the tracking ID stored in the transaction service server 3 or the user terminal 4-2 to the advertisement server 2 according to the information included in the thanks page. The reward giving unit 212 acquires the advertisement selection log associated with the tracking ID received from the user terminal 4-2. Accordingly, the reward giving unit 212 may recognize that the action corresponding to the successful result of the advertisement is taken. The reward giving unit 212 acquires the affiliater ID from the acquired advertisement selection log. The reward giving unit 212 may identify the user to which the reward is given based on the affiliater ID. Alternatively, the user ID of the user U1 included in the advertisement may be transmitted from the user terminal 4-2 to the transaction service server 3. Then, the user ID may be stored in the transaction service server 3 or may be stored as a cookie in the user terminal 4-2. Then, when the user terminal 4-2 displays the thanks page, the user terminal 4-2 may transmit the stored user ID to the advertisement server 2. Furthermore, in a case where the user U2 takes the action corresponding to the successful result of the advertisement, the transaction service server 3 may transmit the tracking ID to the advertisement server 2 instead that the user terminal 4-2 transmits the tracking ID to the advertisement server 2.

When the user U1 to which the reward is given is identified, the reward giving unit 212 executes processing of giving the reward to the user U1. For example, the reward giving unit 212 may determine a predetermined ratio of the advertisement unit price of the corresponding advertisement as the reward amount. In a case where the reward is a point, the reward giving unit 212 may add the number of points corresponding to the reward amount to the number of possessed points of the user U1. In a case where the reward is given by legal currency, information regarding a savings account of each user may be stored in the member DB 14a. For example, the reward giving unit 212 may access the online system of the bank, and may remit the savings currency corresponding to the reward amount from the savings account of the transaction service in which the conversion is made, the savings account of the advertiser, or the savings account of the advertisement distributor that manages the advertisement server 2 to the savings account of the user U1 based on the information regarding the savings account of the user U1. The reward may be given in real time or periodically (for example, every month).

The reward giving unit 212 may execute processing of giving the reward to the user U1 and processing of giving the reward to the party managing the RCS system through which the message is transmitted from the user terminal 4-1 to the user terminal 4-2. The application for RCS or the chat screen has a function as an advertisement medium. It is considered to be reasonable to give the reward to the provider of the advertisement medium. In this case, the reward is distributed to the user U1 and the managing party. The advertisement transmitted from message management server 1 may include information indicating a managing party of the RCS. This information may be at least one of the RCS-ID or the chat ID. The information indicating the managing party of the RCS may be stored in the advertisement server 2, the transaction service server 3, or the user terminal 4-2 by the same method as the method using the user ID of the user U1. Then, the reward giving unit 212 may identify the managing party to which the reward is given by the same method as the method using the user ID of the user U1. In the case of the chat ID, the reward giving unit 212 may transmit, for example, an inquiry including the chat ID to each message management server 1. Each message management server 1 may search the chat DB 14c for the chat ID included in the inquiry, and transmit a response indicating the presence or absence of the chat ID to the advertisement server 2. The reward giving unit 212 may identify the managing party of the RCS to which the reward is given based on the response from each message management server 1.

Note that even when the user U1 takes the action corresponding to successful result of the advertisement after the user U1 selects the advertisement displayed on the user terminal 4-1, no reward is given to the user U1. In this case, the reward giving unit 212 may give the reward to the provider of the RCS.

4. Operation of Advertisement System

Next, an operation of the advertisement system S will be described with reference to FIGS. 10 to 13. FIGS. 10 to 13 are sequence diagrams illustrating an example of the operation of the advertisement system S according to the embodiment.

The user U1 inputs the message to the message input field 120 of the chat screen 100-1 and selects transmission. In response to this, as illustrated in FIG. 10, the user terminal 4-1 transmits the input message and the chat ID of the chat room corresponding to the chat screen 100-1 to the message management server 1 (Step S101). Furthermore, the user terminal 4-1 displays the transmitted message to the message display area 110 (Step S102). The message management server 1 acquires the user ID stored in the chat DB 14c in association with the chat ID received from the user terminal 4-1. The message management server 1 identifies the user U2 that is the transfer destination of the message based on the acquired user ID. The message management server 1 transfers the message received from the user terminal 4-1 and the chat ID to the user terminal 4-2 used by the user U2 (Step S103). The user terminal 4-2 that has received the message and the chat ID displays the message in the message display area of the chat screen 100-2 corresponding to the chat ID (Step S104).

Thereafter, the user U1 selects the message displayed on the chat screen 100-1 (Step S105). In response to this, the user terminal 4-1 transmits a transaction service menu request including the selected message to the message management server 1 (Step S106). The first transmission unit 111 of the message management server 1 that has received the transaction service menu request transmits the transaction service request including the user ID of the user U1 to the advertisement server 2 (Step S107). The advertisement providing unit 211 of the advertisement server 2 acquires the user ID from the transaction service request received from the message management server 1. Then, the advertisement providing unit 211 determines the transaction service corresponding to the attribute of the user indicated by the user ID (Step S108). For example, the advertisement providing unit 211 extracts the transaction service in which the user U1 accepts the advertisement with reference to the advertisement permission information stored in the advertisement permission information DB 14b in association with the user ID. Furthermore, the advertisement providing unit 211 acquires the user attribute information stored in the user attribute DB 24a in association with the user ID. The advertisement providing unit 211 compares the conversion rates in the extracted transaction services with each other based on the user attribute information. For example, the advertisement providing unit 211 may determine the transaction service having the highest conversion rate. Alternatively, the advertisement providing unit 211 may determine one or more transaction services of which the conversion rate is a predetermined value or greater. The advertisement providing unit 211 transmits a transaction service response including the service ID of the determined transaction service to the message management server 1 (Step S109).

The first transmission unit 111 of the message management server 1 that has received the transaction service response generates data for displaying the transaction service menu 400 including the transaction service buttons 410 indicated by the service ID included in the transaction service response. The first transmission unit 111 transmits a transaction service menu response including the generated data to the user terminal 4-1 (Step S110). The user terminal 4-1 displays the transaction service menu 400 on the screen according to the transaction service menu response received from the message management server 1 (Step S111).

Thereafter, as illustrated in FIG. 11, the user U1 selects any of the transaction service buttons 410 from the transaction service menu 400 (Step S201). In response to this, the user terminal 4-1 transmits an advertisement request including the service ID of the transaction service corresponding to the selected transaction service button 410 to the message management server (Step S202). The first transmission unit 111 of the message management server 1 acquires the service ID from the advertisement request received from the user terminal 4-1. Then, the first transmission unit 111 transmits the advertisement request including the service ID, the message received from the user terminal 4-1 in Step S106, the user ID of the user U1, and the chat ID of the chat room corresponding to the chat screen 100-1 of the user terminal 4-1 to the advertisement server 2 (Step S203). The advertisement providing unit 211 of the advertisement server 2 acquires the service ID, the message, and the user ID from the advertisement request received from the message management server 1. The advertisement providing unit 211 extracts at least one keyword from the message. Then, the advertisement providing unit 211 transmits a search request including the at least one keyword and the user ID to the transaction service server 3 corresponding to the service ID acquired from the advertisement request (Step S204). The transaction service server 3 acquires the at least one keyword from the search request received from the message management server. For example, the transaction service server 3 searches for the transaction target associated with content information including the at least one keyword among transaction targets for which the advertisement is provided to the advertisement system S, in the transaction service corresponding to the transaction service server 3. For each found transaction target, the transaction service server 3 acquires the conversion rate of the user indicated by the user ID included in the search request. Then, the transaction service server 3 extracts one or more transaction targets having a relatively high conversion rate from among the found transaction targets. The transaction service server 3 transmits the search results including the transaction target IDs of the extracted transaction targets and the conversion rates to the advertisement server 2 (Step S205).

The advertisement providing unit 211 of the advertisement server 2 that has received the search results determines the advertisement to be provided to the message management server 1 (Step S206). For example, the advertisement providing unit 211 acquires the advertisement unit price associated with the transaction target ID included in the search results from the advertisement DB 24b. Then, the advertisement providing unit 211 determines the advertisement based on the advertisement unit price and the conversion rate included in the search results. Next, the advertisement providing unit 211 generates content of the determined advertisement. For example, the advertisement providing unit 211 acquires the advertisement ID, the service ID, and the advertisement image of the determined advertisement from the advertisement DB 24b. The advertisement providing unit 211 generates the affiliate link including the advertisement ID, the service ID, the link destination URL, the user ID of the user U1, the RCS-ID of the message management server 1 that has transmitted the advertisement request, and the chat ID of the chat room corresponding to the chat screen 100-1 of the user terminal 4-1. Furthermore, the advertisement providing unit 211 generates the control data including a tag or an instruction for displaying the advertisement image. The advertisement providing unit 211 transmits the advertisement content including the control data and the advertisement image to the message management server 1 (Step S207). The first transmission unit 111 of the message management server 1 that has received the advertisement content transmits the advertisement content together with the data for displaying the sharing button to the user terminal 4-1 (Step S208). The user terminal 4-1 that has received the advertisement content displays the advertisement image on the screen according to the advertisement content, and displays the sharing button according to the data received together with the advertisement content (Step S209).

Thereafter, when the user U1 selects the sharing button (Step S210), the user terminal 4-1 transmits the advertisement content and the chat ID of the chat room corresponding to the chat screen 100-1 to the message management server 1 (Step S211). The second transmission unit 113 of the message management server 1 acquires the user ID stored in the chat DB 14c in association with the chat ID received from the user terminal 4-1. The message management server 1 identifies the user U2 that is the transfer destination of the advertisement content based on the acquired user ID. The message management server 1 transfers the advertisement content and the chat ID, which are received from the user terminal 4-1, to the user terminal 4-2 used by the user U2 (Step S212). The user terminal 4-2 which receives the advertisement content and the chat ID displays the advertisement image in the message display area of the chat screen 100-2 corresponding to the chat ID according to the advertisement content (Step S213). Note that the second transmission unit 113 may acquire the advertisement permission information associated with the user ID of the user U2 from the advertisement permission information DB 14b. With reference to the advertisement permission information, the second transmission unit 113 may not transfer the advertisement content in a case where the user U2 does not accept the advertisement from the transaction service indicated by the service ID included in the advertisement content.

Thereafter, as illustrated in FIG. 12, the user U2 selects the advertisement displayed on the chat screen 100-2 (Step S301). In response to this, the user terminal 4-2 transmits a content request including the URL set to the affiliate link included in the advertisement content to the advertisement server 2 (Step S302). The reward giving unit 212 of the advertisement server 2 that has received the content request acquires the user ID of the user U1, the advertisement ID, the service ID, the RCS-ID, the chat ID, and the link destination URL from the URL included in the content request. The reward giving unit 212 generates a new tracking ID, and generates the advertisement selection log including information acquired from the content request and the user ID of the user U2. The user ID of the user U1 is included, as the affiliater ID, in the advertisement selection log. The user ID of the user U2 is included, as the selection user ID, in the advertisement selection log. The reward giving unit 212 stores the generated advertisement selection log in the advertisement selection history DB 24c (Step S303). Next, the reward giving unit 212 transmits a redirect response including the tracking ID and the link destination URL to the user terminal 4-2 (Step S304).

The user terminal 4-2 transmits a content request including the tracking ID and the link destination URL to the transaction service server 3 corresponding to the link destination URL according to the redirect response received from the advertisement server 2 (Step S305). The transaction service server 3 that has received the content request stores, for example, the tracking ID included in the content request in association with the user ID of the user U2. Furthermore, the transaction service server 3 transmits the content identified by the link destination URL to the user terminal 4-2 (Step S306). The user terminal 4-2 displays the content received from the transaction service server 3 (Step S307).

Thereafter, as illustrated in FIG. 13, the user U2 uses the transaction service provided by the transaction service server 3 that has transmitted the content to perform an action corresponding to the successful result of the advertisement displayed on the user terminal 4-2 such as operation corresponding to purchase of an item for sale advertised by the advertisement (Step S401). In response to this, the user terminal 4-2 transmits a transaction acceptance request to the transaction service server 3 (Step S402). The transaction service server 3 that has received the transaction acceptance request executes, for example, processing of approving of a transaction corresponding to the action corresponding to the successful result of the advertisement. Then, the transaction service server 3 transmits the thanks page including the tracking ID stored in association with the user ID of the user U2 to the user terminal 4-2 (Step S403). The user terminal 4-2 transmits the tracking ID to the advertisement server 2 according to the conversion tag or the like included in the thanks page received from the transaction service server 3 (Step S404). The reward giving unit 212 of the advertisement server 2 that has received the tracking ID determines the reward corresponding to the successful result of the advertisement (Step S405). For example, the reward giving unit 212 acquires the advertisement selection log associated with the tracking ID from the advertisement selection history DB 24c. The reward giving unit 212 acquires the advertisement ID from the advertisement selection log. The reward giving unit 212 acquires the advertisement unit price associated with the advertisement ID from an advertisement DB 24b. The reward giving unit 212 calculates the affiliater reward amount by multiplying the advertisement unit price by a predetermined first ratio. Furthermore, the reward giving unit 212 calculates the RCS reward amount by multiplying the advertisement unit price by a predetermined second ratio. Furthermore, the reward giving unit 212 acquires the RCS-ID, the chat ID, and the affiliater ID from the advertisement selection log. The reward giving unit 212 generates the reward information including the acquired information and the determined reward amounts. The reward giving unit 212 stores the generated reward information in the reward DB 24d.

Thereafter, for example, the reward giving unit 212 gives the reward to the user at the turn of the month or the like (Step S406). For example, the reward giving unit 212 searches for the reward information including the user ID of the user as the affiliater ID for each user from among the reward information stored in the reward DB 24d during the past month. The reward giving unit 212 adds up the affiliater reward amounts included in the found reward information. Then, the reward giving unit 212 updates the number of possessed points stored in the member DB 14a by adding the number of points corresponding to the total amount to the number of possessed points of the target user. Furthermore, the reward giving unit 212 gives the reward to the provider of the RCS (Step S407). For example, the reward giving unit 212 searches for the reward information including the RCS-ID of the provider for each provider from among the reward information stored in the reward DB 24d during the past month. The reward giving unit 212 adds up the RCS reward amounts included in the found reward information. Then, the reward giving unit 212 accesses the online system of the bank and remits the savings currency corresponding to the total amount to the savings account of the provider of the RCS.

Note that in Step S210 illustrated in FIG. 11, in a case where the user U1 selects the advertisement instead of the sharing button, processing basically similar to that in FIGS. 12 and 14 is executed except that the user and the user terminal 4 are different. However, since the affiliater ID and selection user ID included in the advertisement selection log stored in Step S303 are the same, the reward giving unit 212 may determine the affiliater reward amount to be zero in Step S405.

As described above, according to the present embodiment, the message management server 1 transmits the advertisement to the user terminal 4-1 based on transmission of the message from the user terminal 4-1 to the user terminal 4-2. Furthermore, the message management server 1 causes the user terminal 4-1 to display the operation part operable for transmitting the advertisement transmitted to the user terminal 4-1 to the user terminal 4-2. Furthermore, according to operation of the operation part displayed on the user terminal 4-1 by the user U1, the message management server 1 transmits the advertisement transmitted to the user terminal 4-1 to the user terminal 4-2. Furthermore, the advertisement server 2 executes processing of giving the reward to the user U1 based on recognition that the user U2 takes an action corresponding to a successful result of the advertisement after the user U2 selects the advertisement transmitted to the user terminal 4-2. Thus, the advertisement is transmitted to the user terminal 4-1 based on transmission of the message from the user terminal 4-1, and the operation part is displayed by the user terminal 4-1. Based on operation of the displayed operation part by the user U1, the advertisement is transmitted to the user terminal 4-2 to which the message is transmitted. When the user U2 selects the advertisement and takes an action corresponding to the successful result of the advertisement, the reward is given to the user U1. Therefore, the sender can acquire the advertisement that can obtain the reward for the successful result of the advertisement by transmitting the message.

Here, the advertisement transmitted to the user terminal 4-1 by the message management server 1 may be the advertisement corresponding to the attribute of the user U1. In this case, the advertisement corresponding to the attribute of the user U1 is transmitted to the user terminal 4-2 based on selection of the operation part. Since the user U1 transmits the message to the user U2, it is estimated that the user U1 and the user U2 are in a relationship of exchanging messages between them. Therefore, there is a possibility that a common attribute exists between the user U1 and the user U2. The common attribute may be a potential attribute that cannot be identified with the action of the user U2 itself or a situation in which the user U2 is placed. Therefore, the advertisement corresponding to the attribute of the user U1 is provided to the user U2, so that effects of the advertisement can be increased.

Furthermore, the advertisement transmitted to the user terminal 4-1 by the message management server 1 may be an advertisement related to the message transmitted from the user terminal 4-1 to the user terminal 4-2. In this case, the advertisement related to the message transmitted from the user U1 is transmitted to the user terminal 4-2 based on selection of the operation part. As described above, since the user U1 transmits the message to the user U2, it is estimated that the user U1 and the user U2 are in a relationship of exchanging messages between them. Therefore, the matter related to the message transmitted by the user U1 may be a matter in which the user U2 is interested. Since the advertisement in which the user U2 may be interested is presented to the user U2, the effects of the advertisement can be increased.

Furthermore, the message management server 1 may transmit the advertisement to the user terminal 4-1 based on selection of the message displayed on the chat screen 100-1 of the user terminal 4-1 by the user U1. In this case, the advertisement is transmitted to the user terminal 4-1 based on selection, from the screen by the user U1, of the message transmitted by the user U1. Here, in a case where the advertisement is an advertisement related to the message transmitted from the user terminal 4-1 to the user terminal 4-2, the user U1 can select a message related to an advertisement they will receive.

Furthermore, the message management server 1 may transmit the advertisement with the user ID for identifying the user U1 as a user to which the reward is given. Furthermore, in response to selection, by the user U2, of the advertisement transmitted by the message management server 1 to the user terminal 4-2, the user ID attached to the advertisement may be transmitted from the user terminal 4-2 and stored. Furthermore, the advertisement server 2 may acquire the stored user ID according to the action taken by the user U2 corresponding to the successful result of the advertisement, and identify the user to which the reward is given based on the user ID. In this case, the advertisement with the user ID for identifying the user U1 is transmitted to the user terminal 4-1, and the advertisement is transmitted to the user terminal 4-2 when the operation part is selected. When the user U2 selects the advertisement, the user terminal 4-2 transmits the user ID attached to the advertisement, and the user ID is stored. When the user U2 takes the action corresponding to the successful result of the advertisement, the stored user ID is acquired, and the user to which the reward is given is identified as the user U1 based on the user ID. Therefore, it is possible to appropriately identify the user to which the reward is given.

Furthermore, the advertisement server 2 may execute processing of giving the reward to the user U1 and processing of giving the reward to the party managing the message system based on recognition that the user U2 takes the action corresponding to the successful result of the advertisement after the user U2 selects the advertisement transmitted to the user terminal 4-2. In this case, when the user U2 selects the advertisement and takes the action corresponding to the successful result of the advertisement, the reward is given to the party managing the message system. When the advertisement is displayed on the screen or the user interface, which are provided by the message system, the screen or the user interface is considered to be an advertisement medium. Therefore, the reward for the successful result of the advertisement can be given to the provider of the advertisement medium.

Furthermore, the message management server 1 may display the advertisement on the chat screen 100-2 of the user terminal 4-2. In this case, the advertisement can be displayed by the user terminal 4-2 together with the message transmitted from the user terminal 4-1.

The invention claimed is:

1. An information communication system comprising:
   at least one memory having computer program code stored thereon; and
   at least one processor configured to read the computer program code from the at least one memory and operate as instructed by the computer program code, the computer program code comprising:
   user interface displaying code configured to cause at least one of the at least one processor to cause a first terminal device used by a first user to display, on a first user screen of the first terminal device, a first user interface via which messages, including at least one transmitted message, are transmitted and received between the first terminal device and a second terminal device used by a second user, the first user interface including a message display area and a message input field in which a message is input;
   acquiring code configured to cause at least one of the at least one processor to acquire an advertisement;
   a first transmission code configured to cause at least one of the at least one processor to transmit the advertisement to the first terminal device based on transmission of the message input in the message input field from the first terminal device to the second terminal device;
   a display control code configured to cause at least one of the at least one processor to cause the first terminal device to display an operation part operable to transmit the advertisement transmitted by the first transmission code to the second terminal device;
   a second transmission code configured to cause at least one of the at least one processor to transmit the advertisement transmitted by the first transmission code to the second terminal device in response to operation of the displayed operation part by the first user; and
   a reward giving code configured to cause at least one of the at least one processor to execute processing of giving a reward to the first user based on recognition that the second user takes an action corresponding to a successful result of the advertisement transmitted by the second transmission code after the second user selects the advertisement,
   wherein the display control code is further configured to cause at least one of the at least one processor to cause the first terminal device to display the at least one transmitted message on the message display area of the first user interface on the first user screen of the first terminal device,
   wherein the acquiring code is configured to cause at least one of the at least one processor to acquire the advertisement in response to a selection by the first user of the displayed at least one transmitted message on the first user screen, the advertisement comprising first content related to second content of the selected message,
   wherein the first transmission code is further configured to cause at least one of the at least one processor to transmit the advertisement to the first terminal device in response to the selection by the first user of the displayed at least one transmitted message on the message display area of the first user interface,
   wherein the display control code is further configured to cause at least one of the at least one processor to cause the first terminal device to, in response to the selection by the first user of the displayed at least one transmitted message on the message display area of the first user interface, display the transmitted advertisement on the message display area of the first user interface and display the operation part that is operable to transmit the advertisement transmitted by the first transmission code on the message display area of the first user interface,
   wherein the selection by the first user of the displayed at least one transmitted message on the message display area of the first user interface to display the transmitted advertisement and to display the operation part is made in a way different from inputting the message in the message input field or inputting in the message input field a message replying to the displayed message, and
   wherein the displayed operation part overlaps the message input field.

2. The information communication system according to claim 1, wherein the advertisement transmitted by the first transmission code corresponds to an attribute of the first user.

3. The information communication system according to claim 1, wherein
   the first transmission code is configured to cause at least one of the at least one processor to transmit the advertisement to which identification information for identifying the first user as a user to which the reward is given is attached,
   the identification information attached to the advertisement is transmitted from the second terminal device and stored in response to the selection of the advertisement transmitted by the second transmission code,
   the selection is done by the second user, and
   the reward giving code is configured to cause at least one of the at least one processor to acquire the stored identification information in response to the action taken by the second user, and identifies the user to which the reward is given based on the acquired identification information.

4. The information communication system according to claim 1, wherein
   the at least one transmitted message is transmitted from the first terminal device to the second terminal device by using a message system that enables transmission and reception of messages among a plurality of terminal devices, and
   the reward giving code is configured to cause at least one of the at least one processor to execute processing of giving the reward to the first user and processing of giving a reward to a party managing the message system.

5. The information communication system according to claim 1, wherein
   the second terminal device displays the at least one transmitted message on a second user screen, and
   the second transmission code is configured to cause at least one of the at least one processor to cause the advertisement to be displayed on the second user screen.

6. An information communication method performed by at least one computer, the method comprising:
   displaying, on a first user screen of a first terminal device used by a first user, a first user interface via which messages, including at least one transmitted message, are transmitted and received between the first terminal device and a second terminal device used by a second user, the first user interface including a message display area and a message input field in which a message is input;

acquiring an advertisement;

transmitting the advertisement to the first terminal device based on transmission of the message input in the message input field from the first terminal device to the second terminal device;

causing the first terminal device to display an operation part operable to transmit the advertisement transmitted to the first terminal device to the second terminal device;

transmitting the advertisement transmitted to the first terminal device to the second terminal device in response to operation of the displayed operation part by the first user; and executing processing of giving a reward to the first user based on recognition that the second user takes an action corresponding to a successful result of the advertisement transmitted to the second terminal device after the second user selects the advertisement, wherein the first terminal device displays the at least one transmitted message on the message display area of the first user interface on the first user screen of the first terminal device, wherein acquiring the advertisement is performed in response to a selection by the first user of the displayed at least one transmitted message on the first user screen, the advertisement comprising first content related to second content of the selected message, wherein transmitting the advertisement to the first terminal device is performed in response to the selection by the first user of the displayed at least one transmitted message on the message display area of the first user interface, and wherein the method further comprises, in response to the selection by the first user of the displayed at least one transmitted message on the message display area of the first user interface, displaying the transmitted advertisement on the message display area of the first user interface and display the operation part that is operable to transmit the advertisement transmitted t code on the message display area of the first user interface, wherein the selection by the first user of the displayed at least one transmitted message on the message display area of the first user interface to display the transmitted advertisement and to display the operation part is made in a way different from inputting the message in the message input field or inputting in the message input field a message replying to the displayed message, and wherein the displayed operation part overlaps the message input field.

7. The information communication system according to claim 1, wherein the display control code is further configured to cause at least one of the at least one processor to cause the first terminal device to display a transaction service menu on the first user screen in response to the selection by the first user of the displayed at least one transmitted message, the transaction service menu comprising a selection of transaction services for displaying the advertisement and a plurality of advertisement providers to select for providing the advertisement, and wherein each of the plurality of advertisement providers are included in the transaction service menu based on having a conversion rate that is greater than or equal to a predetermined conversion rate value.

8. The information communication method of claim 6, further comprising displaying a transaction service menu on the first user screen in response to the selection by the first user of the displayed at least one transmitted message, the transaction service menu comprising a selection of transaction services for displaying the advertisement and a plurality of advertisement providers to select for providing the advertisement, wherein each of the plurality of advertisement providers are included in the transaction service menu based on having a conversion rate that is greater than or equal to a predetermined conversion rate value.

9. The information communication system of claim 1, wherein the advertisement transmitted by the first transmission code includes a reward recipient identifier indicating the first user as a recipient of the reward, and wherein the reward giving code is configured to cause at least one of the at least one processor to:

acquire, in response to the first user taking the action corresponding to the successful result of the advertisement displayed on the message display area of the first user interface after the first user selects the displayed advertisement, the reward recipient identifier included in the displayed advertisement and an action-taker identifier indicating the first user as an action-taker who took the action corresponding to the successful result of the advertisement, acquire, in response to the second user taking the action corresponding to the successful result of the advertisement transmitted by the second transmission code after the second user selects the transmitted advertisement, the reward recipient identifier included in the transmitted advertisement and the action-taker identifier indicating the second user as the action-taker, determine whether the acquired reward recipient identifier and the acquired action-taker identifier are the same as each other, give the reward to the first user indicated by the acquired reward recipient identifier in response to determination that the acquired reward recipient identifier and the acquired action-taker identifier are different from each other, and prevent from giving the reward to the first user indicated by the acquired reward recipient identifier in response to determining that the acquired reward recipient identifier and the acquired action-taker identifier are the same as each other.

* * * * *